(12) United States Patent
Zhang et al.

(10) Patent No.: US 11,621,638 B1
(45) Date of Patent: Apr. 4, 2023

(54) POWER CONVERSION SYSTEM, ELECTRONIC DEVICE INCLUDING THE SAME, AND INTEGRATED CIRCUIT

(71) Applicant: NuVolta Technologies (Shanghai) Co., Ltd., Shanghai (CN)

(72) Inventors: Junhe Zhang, Shanghai (CN); Fuchun Zhan, Shanghai (CN)

(73) Assignee: NuVolta Technologies (Hefei) Co., Ltd., Shanghai (CN)

( * ) Notice: Subject to any disclaimer, the term of this patent is extended or adjusted under 35 U.S.C. 154(b) by 0 days.

(21) Appl. No.: 18/087,874

(22) Filed: Dec. 23, 2022

(51) Int. Cl.
  *H02M 3/158* (2006.01)
  *H02J 7/00* (2006.01)
  *H02M 3/07* (2006.01)
  *H02M 1/00* (2006.01)

(52) U.S. Cl.
  CPC ............ *H02M 3/158* (2013.01); *H02J 7/007* (2013.01); *H02M 3/07* (2013.01); *H02J 2207/20* (2020.01); *H02M 1/0003* (2021.05)

(58) Field of Classification Search
  None
  See application file for complete search history.

(56) References Cited

U.S. PATENT DOCUMENTS

| | | | |
|---|---|---|---|
| 9,595,871 B1 * | 3/2017 | Bayer | H02M 3/1582 |
| 10,075,080 B1 | 9/2018 | Scoones et al. | |
| 10,811,974 B1 * | 10/2020 | Petersen | H02M 3/1582 |
| 2020/0021196 A1 * | 1/2020 | Scoones | H02M 3/158 |
| 2021/0067033 A1 | 3/2021 | Jing et al. | |
| 2021/0376622 A1 | 12/2021 | Guo et al. | |

FOREIGN PATENT DOCUMENTS

| | | | |
|---|---|---|---|
| CN | 204538966 U | 8/2015 | |
| CN | 109787318 A | 5/2019 | |
| CN | 110492732 A | 11/2019 | |
| CN | 113612385 A | 11/2021 | |
| CN | 113824196 A | 12/2021 | |
| CN | 114070041 | * 2/2022 | ............ H02M 1/083 |
| CN | 114938140 | * 8/2022 | ............ H02M 1/14 |
| DE | 102020200927 | * 7/2021 | ............ G05F 1/595 |

* cited by examiner

*Primary Examiner* — Matthew V Nguyen
(74) *Attorney, Agent, or Firm* — Slater Matsil, LLP

(57) ABSTRACT

The present invention provides a power conversion system, an electronic device including the same, and an integrated circuit, and relates to the field of power supplies. By arranging a second switch series branch connected to a switch series branch of a switch capacitor converter, and matching a switch in the second switch series branch and a switch in the switch series branch of the switch capacitor converter, a function of a three-level buck converter is achieved, so that the three-level buck converter and the switch capacitor converter are integrated. The quantity of switches is reduced. The volume is small. The costs are low, and high efficiency of a whole process of charging a battery of the electronic device is achieved while supplying power to a power consumption unit of the electronic device.

15 Claims, 16 Drawing Sheets

POWER CONVERSION SYSTEM, ELECTRONIC DEVICE INCLUDING THE SAME, AND INTEGRATED CIRCUIT

PRIORITY CLAIM

This application claims the benefit of and priority to Chinese patent Application No. 202210115196.3, filed on Feb. 5, 2022, which is hereby incorporated by reference in its entirety.

TECHNICAL FIELD

The present invention relates to the field of power supplies, and in particular, to a power conversion system, an electronic device including the same, and an integrated circuit.

BACKGROUND

With the continuous advances of technologies, various electronic devices such as portable devices (including mobile phones, tablet computers, digital cameras, MP3 players and/or other similar electronic devices) have become popular. For each electronic device, a plurality of rechargeable battery units connected in series and/or in parallel may be used to form a rechargeable battery configured to store electric energy. The rechargeable battery may be charged by an adapter connected to the electronic device and a power conversion structure in the electronic device, to restore energy of batteries, and the rechargeable battery may be any type of battery such as a lithium ion (Li-ion) battery.

The power conversion structure adapted to charge the rechargeable battery is diversified. Referring to a typical buck converter shown in FIG. 1 and a typical three-level buck converter shown in FIG. 2, the converters are inductor-based buck converters, and are widely applied to power conversion structures for charging batteries. In FIG. 1, a switch S1, a switch S2, an inductor L, an input side capacitor Cin, and an output side capacitor Cout form the typical buck converter. In FIG. 2, a switch S1, a switch S2, a switch S3, a switch S4, an inductor L, a flying capacitor Cf, an input side capacitor Cin, and an output side capacitor Cout form the typical three-level buck converter. However, the foregoing two converters have relatively low efficiency, the efficiency of the typical buck converter shown in FIG. 1 is about 92%, and the efficiency of the typical three-level buck converter shown in FIG. 2 is about 95.5%, failing to meet requirements of the market for quick charging and high efficiency of power conversion structures. Referring to a typical switch capacitor converter shown in FIG. 3 and a typical two-phase switch capacitor converter shown in FIG. 4, the converters can achieve an input-to-output ratio, namely, a conversion ratio of 1:1 or 2:1. In FIG. 3, a switch S1, a switch S2, a switch S3, a switch S4, a flying capacitor Cf, an input side capacitor Cin, and an output side capacitor Cout form the typical switch capacitor converter. In FIG. 4, switches S1 to S8, flying capacitors Cf1 and Cf2, an input side capacitor Cin, and an output side capacitor Cout form the typical two-phase switch capacitor converter. Because of compact structures and relatively high efficiency, switch capacitor converters, particularly, the typical two-phase switch capacitor converter shown in FIG. 4 are widely applied.

With the development of power supply technologies, a power conversion structure formed through collaboration between an inductor-based buck converter and a switch capacitor converter is recognized to charge a rechargeable battery, may have advantages of both the inductor-based buck converter and the switch capacitor converter, and may be flexibly configured to meet requirements of the battery at different charging stages, where the battery includes a trickle charging stage, a pre-charging stage, a constant current charging stage, a constant voltage charging stage, and a cutoff charging stage. However, a current solution of collaboration between an inductor-based buck converter and a switch capacitor converter has a large quantity of switches, high costs, and a large volume.

That is, none of the current power conversion structures can meet high efficiency in a whole process of charging a battery, and the power conversion structures have high costs and large volumes, contradicting a development trend toward miniaturization, low costs, and high efficiency of power converters.

SUMMARY

The present invention provides a power conversion system, including: a power conversion structure, including a first switch series branch, a second switch series branch, a seventh switch, an inductor unit, and a first flying capacitor, where the first switch series branch includes a first switch, a second switch, a third switch, and a fourth switch connected in series, the second switch series branch includes a fifth switch and a sixth switch connected in series, a first terminal of the first switch series branch is connected to an input terminal, the input terminal is configured to receive an input voltage, a second terminal of the first switch series branch is grounded, a common node of the first switch and the second switch is connected to a first terminal of the first flying capacitor and a first terminal of the second switch series branch, a common node of the third switch and the fourth switch is connected to a second terminal of the first flying capacitor and a second terminal of the second switch series branch, a common node of the fifth switch and the sixth switch is connected to a first terminal of the inductor unit, a second terminal of the inductor unit is connected to an output terminal, the seventh switch includes a first terminal, a second terminal, and a control terminal, the first terminal of the seventh switch is connected to the output terminal, the second terminal of the seventh switch is connected to a common node of the second switch and the third switch, the common node of the second switch and the third switch is configured to be connected to a battery, the control terminal of the seventh switch is configured to receive a switch control signal, the second terminal of the inductor unit is further connected to a first terminal of a capacitor unit, and a second terminal of the capacitor unit is grounded; and a controller, where the controller is configured to: control, when the input terminal receives an input voltage, the power conversion structure to work in one of a plurality of working modes, where the plurality of working modes include: a first working mode, where the controller controls the seventh switch to be in a saturated state or completely turned-on state and the second switch and the third switch to be turned off, and controls the first switch, the fourth switch, the fifth switch, and the sixth switch to work to supply power to a load connected to the output terminal and charge the battery connected to the common node of the second switch and the third switch; a second working mode, where the controller controls the seventh switch to be turned on, controls the fifth switch and the sixth switch to be turned off, and controls the first switch, the second switch, the third switch, and the fourth switch to work to charge the battery connected to the common node of the second switch and the third switch and supply power to the load connected to the output terminal; and a third working mode, where the controller controls the seventh switch, the second switch, and the third switch to be turned off, and the first switch, the fourth switch, the fifth switch, and the sixth switch work, to supply power to the load connected to the output terminal.

The present invention further provides an electronic device, including: the power conversion system described above; a battery, where a first terminal of the battery is connected to the common node of the second switch and the third switch, and a second terminal of the battery is grounded; and a load, where the load is connected to the output terminal, to receive an electric signal outputted by the output terminal.

The present invention further provides a power conversion system, including: a power conversion structure, including a first switch series branch, a second switch series branch, a seventh switch, an inductor unit, and a first flying capacitor, where the first switch series branch includes a first switch, a second switch, a third switch, and a fourth switch connected in series, the second switch series branch includes a fifth switch and a sixth switch connected in series, a first terminal of the first switch series branch is formed into an input terminal, the input terminal is configured to receive an input voltage, a second terminal of the first switch series branch is grounded, a common node of the first switch and the second switch is connected to a first terminal of the first flying capacitor and a first terminal of the second switch series branch, a common node of the third switch and the fourth switch is connected to a second terminal of the first flying capacitor and a second terminal of the second switch series branch, a common node of the fifth switch and the sixth switch is connected to a first terminal of the inductor unit, a second terminal of the inductor unit is connected to an output terminal, the seventh switch includes a first terminal, a second terminal, and a control terminal, the first terminal of the seventh switch is connected to the output terminal, the second terminal of the seventh switch is connected to a common node of the second switch and the third switch, the common node of the second switch and the third switch is configured to be connected to a battery, the control terminal of the seventh switch is configured to receive a switch control signal, the second terminal of the inductor unit is further connected to a first terminal of a capacitor unit, and a second terminal of the capacitor unit is grounded; and a controller, where the controller is configured to: when the input voltage received by the input terminal is zero volts and the battery connected to the common node of the second switch and the third switch supplies power to a load connected to the output terminal, in response to a case that a voltage of the output terminal is reduced to a threshold voltage, the controller controls the power conversion structure to work in an output voltage back-adjustment mode; and in the output voltage back-adjustment mode, the controller controls the first switch, the second switch, the third switch, the fourth switch, the fifth switch, and the sixth switch to work to increase the voltage of the output terminal to a value greater than a voltage of the battery.

The present invention further provides an electronic device, including: the power conversion system described above; a battery, where a first terminal of the battery is connected to the common node of the second switch and the third switch, and a second terminal of the battery is grounded; and a load, where the load is connected to the output terminal, to receive an electric signal outputted by the output terminal.

The present invention further provides an integrated circuit, including: an input terminal, configured to receive an input voltage; a first switch, connected between the input terminal and a first top electrode plate node, where the first switch has a first control node; a second switch, connected between the first top electrode plate node and a battery terminal, where the second switch has a second control node, and the battery terminal is configured to be connected to a battery; a third switch, connected between the battery terminal and a first bottom electrode plate node, where the third switch has a third control node; a fourth switch, connected between the first bottom electrode plate node and a grounding terminal, where the fourth switch has a fourth control node; a conversion node terminal, configured to provide an electric signal at a conversion node to an inductor, where the inductor is connected in series between the conversion node terminal and a system terminal, and a capacitor is connected between the system terminal and the grounding terminal; a fifth switch, connected between the first top electrode plate node and the conversion node terminal, where the fifth switch has a fifth control node; a sixth switch, connected between the first bottom electrode plate node and the conversion node terminal, where the sixth switch has a sixth control node; a seventh switch, connected between the system terminal and the battery terminal, where the seventh switch has a seventh control node; a first flying capacitor terminal and a second flying capacitor terminal, configured to be respectively connected to a first terminal and a second terminal of a first flying capacitor, where the first flying capacitor terminal is connected to the first top electrode plate node, and the second flying capacitor terminal is connected to the first bottom electrode plate node.

DETAILED DESCRIPTION OF ILLUSTRATIVE EMBODIMENTS

Figure 1:
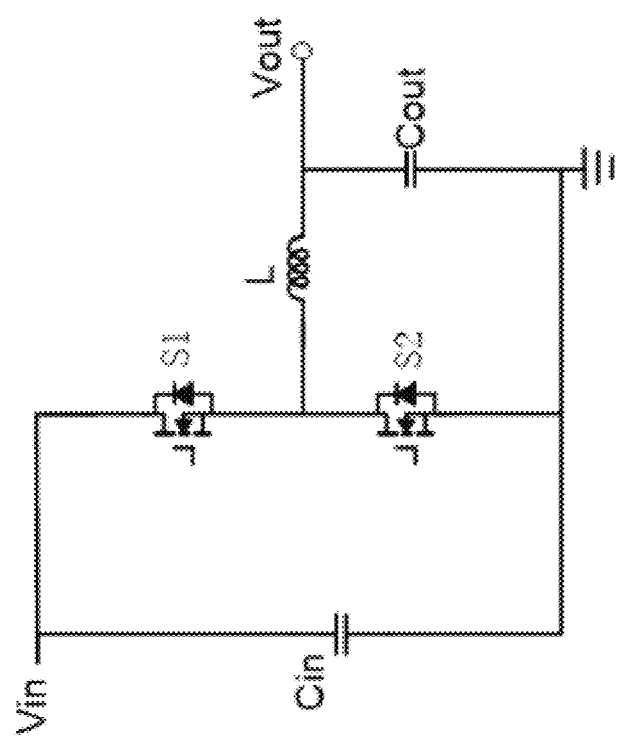
FIG. 1 is a schematic circuit diagram of a typical buck converter.
Figure 2:
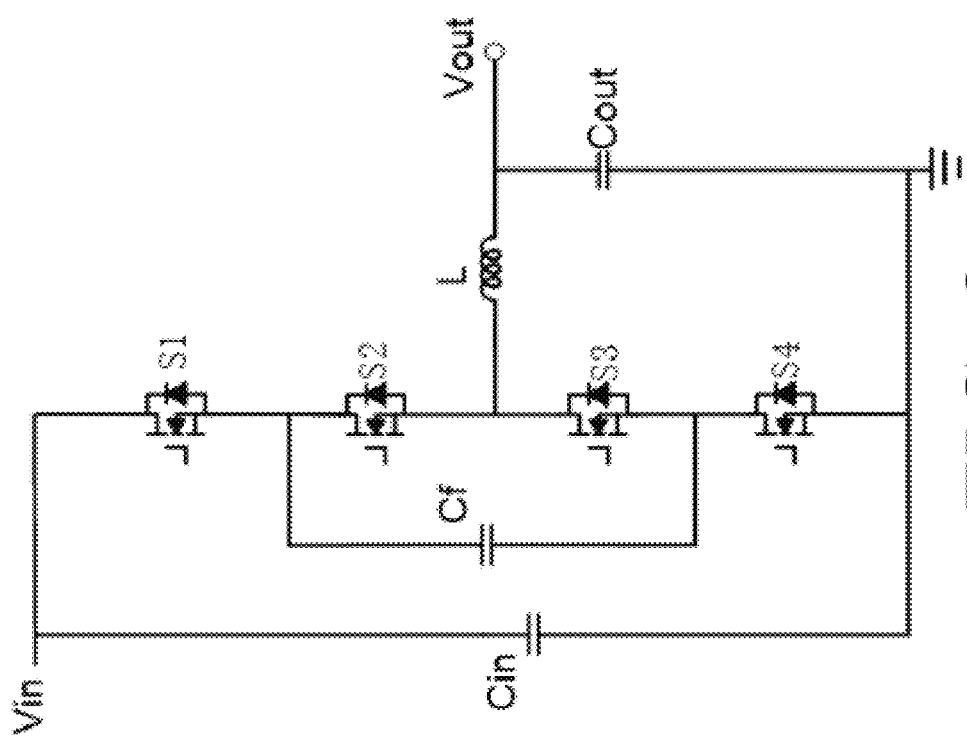
FIG. 2 is a schematic diagram of a typical three-level buck converter.
Figure 3:
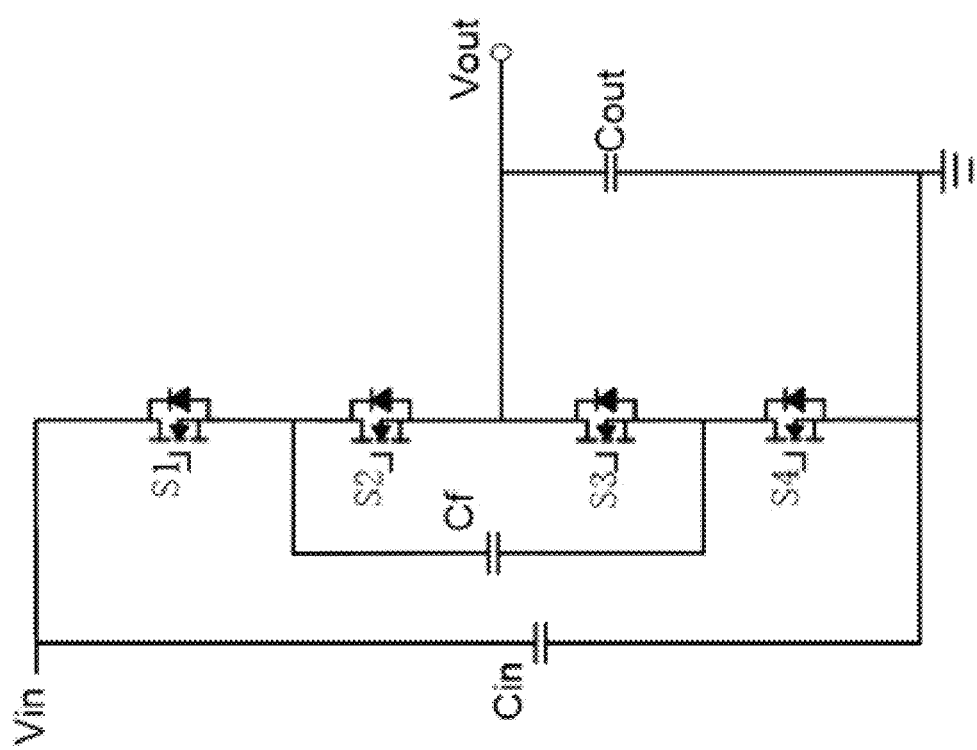
FIG. 3 is a schematic diagram of a typical switch capacitor converter.
Figure 4:
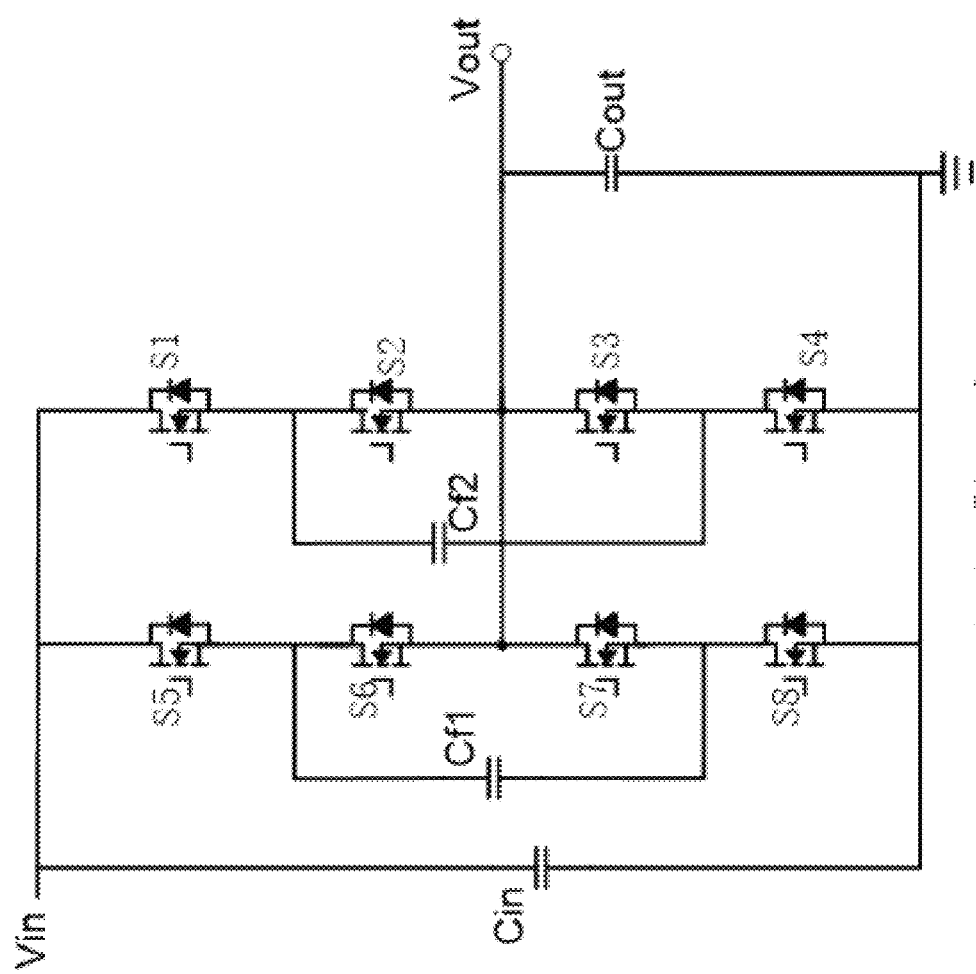
FIG. 4 is a schematic diagram of a typical two-phase switch capacitor converter.

The following clearly and completely describes the technical solutions in the present disclosure with reference to the accompanying drawings. Apparently, the described embodiments are some rather than all of the embodiments of the present invention. All other embodiments obtained by a person of ordinary skill in the art based on the embodiments of the present invention without creative efforts shall fall within the protection scope of the present invention.

In an embodiment of the present invention, a power conversion system is provided, and may be applied to an electronic device. For details, reference is made to a schematic diagram of a power conversion system according to an embodiment of the present invention shown in FIG. 5. The power conversion system includes a power conversion structure 100 and a controller 400, where the power conversion structure 100 includes: a first switch series branch 110, a second switch series branch 120, a seventh switch Q7, an inductor unit L1, and a first flying capacitor Cf1, where the first switch series branch 110 includes a first switch Q1, a second switch Q2, a third switch Q3, and a fourth switch Q4 connected in series, the second switch series branch 120 includes a fifth switch Q5 and a sixth switch Q6 connected in series, a first terminal d11 of the first switch series branch 110 is connected to an input terminal din, the input terminal din is configured to receive an input voltage Vin, a second terminal d12 of the first switch series branch 110 is grounded, a common node of the first switch Q1 and the second switch Q2 is connected to a first terminal of the first flying capacitor Cf1 and a first terminal d21 of the second switch series branch 120, a common node of the third switch Q3 and the fourth switch Q4 is connected to a second terminal of the first flying capacitor Cf1 and a second terminal d22 of the second switch series branch 120, a common node of the fifth switch Q5 and the sixth switch Q6 is connected to a first terminal of the inductor unit L1, a second terminal of the inductor unit L1 is connected to an output terminal dout, the seventh switch Q7 includes a first terminal d31, a second terminal d32, and a control terminal d33, the first terminal d31 of the seventh switch Q7 is connected to the output terminal dout, the output terminal dout is connected to a load 200, the second terminal d32 of the seventh switch Q7 is connected to a common node of the second switch Q2 and the third switch Q3, the common node of the second switch Q2 and the third switch Q3 is configured to be connected to a battery 300, the control terminal d33 of the seventh switch Q7 is configured to receive a switch control signal, the second terminal of the inductor unit L1 is further connected to a first terminal of a capacitor unit C1, and a second terminal of the capacitor unit C1 is grounded; and where the controller 400 is configured to: control, when the input terminal din receives an input voltage Vin, the power conversion structure 100 to work in one of a plurality of working modes, where the plurality of working modes include: a first working mode, where the controller 400 controls the seventh switch Q7 to be in a saturated state or completely turned-on state, controls the second switch Q2 and the third switch Q3 to be turned off, and controls the first switch Q1, the fourth switch Q4, the fifth switch Q5, and the sixth switch Q6 to work to supply power to the load 200 connected to the output terminal dout and charge the battery 300 connected to the common node of the second switch Q2 and the third switch Q3; a second working mode, where the controller 400 controls the seventh switch Q7 to be turned on, controls the fifth switch Q5 and the sixth switch Q6 to be turned off, and controls the first switch Q1, the second switch Q2, the third switch Q3, and the fourth switch Q4 to work to charge the battery 300 connected to the common node of the second switch Q2 and the third switch Q3 and supply power to the load 200 connected to the output terminal dout; and a third working mode, where the controller 400 controls the seventh switch Q7, the second switch Q2, and the third switch Q3 to be turned off, and controls the first switch Q1, the fourth switch Q4, the fifth switch Q5, and the sixth switch Q6 to work to supply power to the load 200 connected to the output terminal dout.

In an embodiment, the load 200 may be a power consumption unit of an electronic device, such as a power consumption unit of portable devices (including mobile phones, tablet computers, digital cameras, MP3 players and/or other similar electronic devices). In an embodiment, the battery 300 may be a rechargeable battery in an electronic device, such as a rechargeable battery in portable devices (including mobile phones, tablet computers, digital cameras, MP3 players and/or other similar electronic devices).

Figure 5:
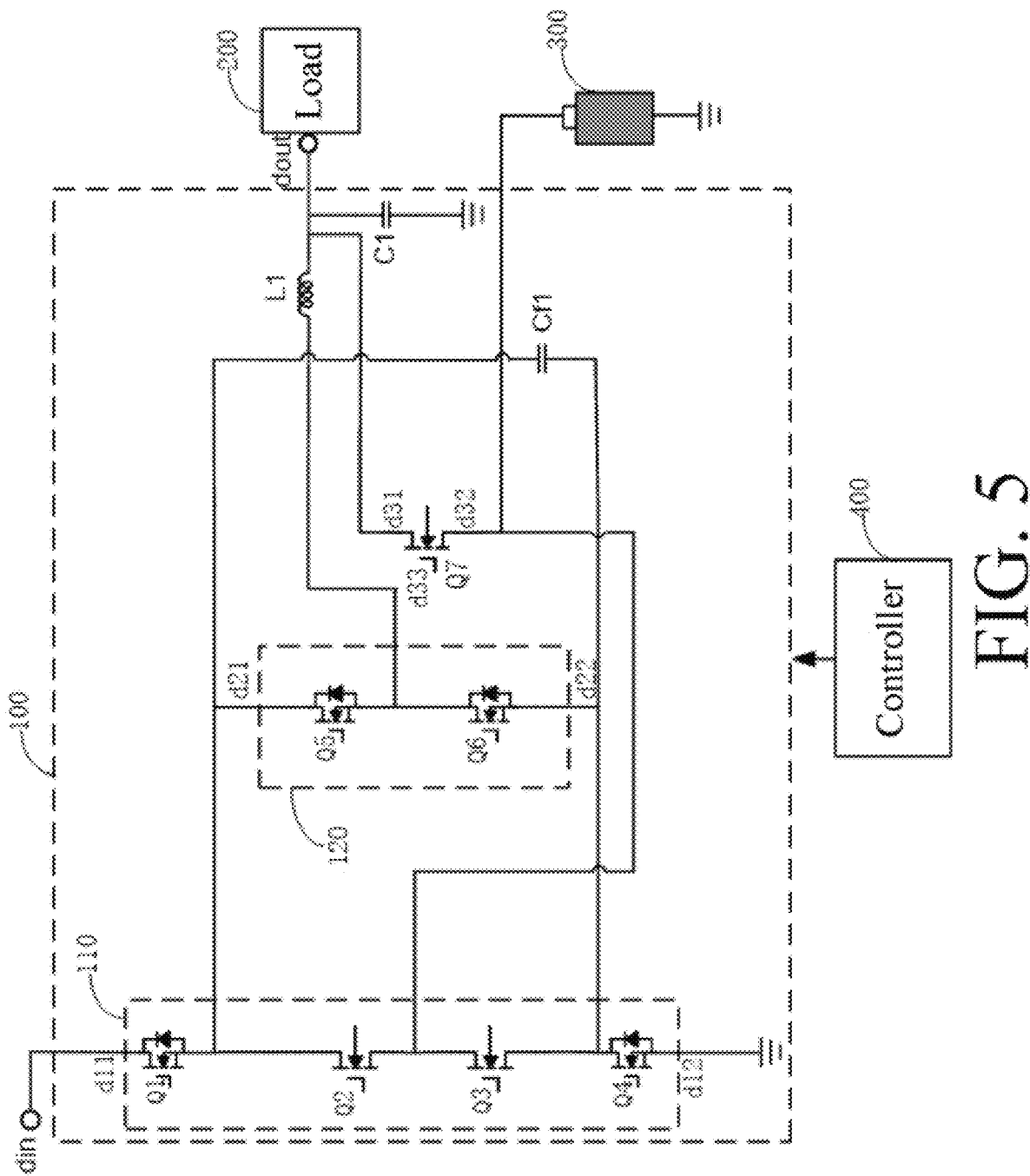
FIG. 5 is a schematic diagram of a power conversion system according to an embodiment of the present invention.

As shown in FIG. 5, the first switch Q1, the second switch Q2, the third switch Q3, the fourth switch Q4, and the first flying capacitor Cf1 form a typical switch capacitor converter, and the first switch Q1, the fifth switch Q5, the sixth switch Q6, the fourth switch Q4, the inductor unit L1, and the first flying capacitor Cf1 form a typical three-level buck converter. In this way, the power conversion structure shown in FIG. 5 may integrate the three-level buck converter and the switch capacitor converter. In addition, as shown in FIG. 5, switches in the second switch series branch 120 and switches in the first switch series branch 110 are collaboratively used to implement a function of the three-level buck converter, and the quantity of switches is reduced, so that the power conversion structure provided in the present invention has a small volume and low costs, and can have advantages of both the three-level buck converter and the switch capacitor converter, to achieve high efficiency of a whole process of charging the battery 300 of the electronic device while supplying power to the power consumption unit of the electronic device, and implement stable and reliable running of the electronic device. In addition, the first flying capacitor Cf1 of the three-level buck converter and the switch capacitor converter is shared, which can further reduce the volume of the power conversion structure.

In an embodiment of actual application, the whole process of charging the battery 300 includes a trickle charging stage, a pre-charging stage, a constant voltage charging stage, a constant current charging stage, and a cutoff charging stage. When the battery 300 needs to be charged, the input terminal din receives an input voltage, that is, the input terminal din is connected to an external power supply. When the battery 300 is at the trickle charging stage, the pre-charging stage, and the constant voltage charging stage, the controller 400 is configured to control the second switch Q2 and the third switch Q3 in the power conversion structure 100 to be turned off, control the first switch Q1, the fourth switch Q4, the fifth switch Q5, and the sixth switch Q6 to work, and control the seventh switch Q7 to be in the saturated state or completely turned-on state, to charge the battery 300 and supply power to the load 200, that is, the power conversion structure works in the first working mode. That the first switch Q1, the fourth switch Q4, the fifth switch Q5, and the sixth switch Q6 work means that the first switch Q1, the fourth switch Q4, the fifth switch Q5, and the sixth switch Q6 switch between being turned on and being turned off with a specific frequency. In this case, the power conversion structure works in a state of a typical three-level buck converter. A working state of the three-level buck converter in a low voltage mode (an output voltage is less than ½ of an input voltage) is introduced below. For details, reference is made to a schematic diagram of a working waveform of a power conversion structure according to an embodiment of the present invention shown in FIG. 6, where a horizontal coordinate is a time t, and a vertical coordinate is a switch control signal SC. First, at a to moment, the first switch Q1 and the sixth switch Q6 are turned on, and the fifth switch Q5 and the fourth switch Q4 are turned off, to form a current path sequentially passing through a positive terminal of the input voltage, the first switch Q1, the first flying capacitor Cf1, the sixth switch Q6, the inductor unit L1, and a negative terminal of the input voltage, so that the first flying capacitor Cf1 performs energy storage, and the inductor unit L1 performs energy storage; then, at a t1 moment, the first switch Q1 is turned off, and the fourth switch Q4 is turned on, to form a current path passing through the inductor unit L1, the fourth switch Q4, and the sixth switch Q6, so that the inductor unit L1 performs current following; then, at a t2 moment, the sixth switch Q6 is turned off, and the fifth switch Q5 is turned on, to form a current path passing through the first flying capacitor Cf1, the fifth switch Q5, the inductor unit L1, and the fourth switch Q4, so that the inductor unit L1 performs energy storage; and then, at a t3 moment, the fifth switch Q5 is turned off, and the sixth switch Q6 is turned on, to form a current path passing through the inductor unit L1, the fourth switch Q4, and the sixth switch Q6, so that the inductor unit L1 performs current following. That is, the first switch Q1, the fourth switch Q4, the fifth switch Q5, and the sixth switch Q6 cyclically work with the foregoing switching period, to implement a function of the three-level buck converter and supply power to the load 200. In addition, in a working process of the three-level buck converter, the seventh switch Q7 is always in the saturated state or completely turned-on state, so that trickle charging, pre-charging, and constant voltage charging are performed for the battery 300 simultaneously. In the constant current charging stage of the battery 300, the controller 400 is configured to control the fifth switch Q5 and the sixth switch Q6 in the power conversion structure 100 to be turned off, control the first switch Q1, the second switch Q2, the third switch Q3, and the fourth switch Q4 to work, and control the seventh switch Q7 to be turned on, to charge the battery 300 and supply power to the load 200, that is, the power conversion structure works in the second working mode. That the first switch Q1, the second switch Q2, the third switch Q3, and the fourth switch Q4 work means that the first switch Q1, the second switch Q2, the third switch Q3, and the fourth switch Q4 switch between being turned on and being turned off with a specific frequency. In this case, the power conversion structure works in a state of a typical switch capacitor converter. A working state of the switch capacitor converter in a low voltage mode (an output voltage is less than ½ of an input voltage) is introduced below. For details, reference is made to a schematic diagram of a working waveform of a power conversion structure according to an embodiment of the present invention shown in FIG. 7, where a horizontal coordinate is a time t, and a vertical coordinate is a switch control signal SC. First, at a to moment, the first switch Q1 and the third switch Q3 are turned on, and the second switch Q2 and the fourth switch Q4 are turned off, to form a current path passing through a positive terminal of the input voltage, the first switch Q1, the first flying capacitor Cf1, the third switch Q3, the battery 300, and a negative terminal of the input voltage, so that the first flying capacitor Cf1 performs energy storage and charges the battery 300; and then, at t1 moment, the second switch Q2 and the fourth switch Q4 are turned on, and the first switch Q1 and the third switch Q3 are turned off, to form a current path passing through the first flying capacitor Cf1, the second switch Q2, the battery 300, and the fourth switch Q4, so that the first flying capacitor Cf1 charges the battery 300. That is, the first switch Q1, the second switch Q2, the third switch Q3, and the fourth switch Q4 cyclically work with the foregoing switching period, to implement a function of the switch capacitor converter and charge the battery 300 with a constant current. In addition, in a working process of the switch capacitor converter, the seventh switch Q7 is always in the turned-on state, and then supplies power to the load 200 simultaneously. In the cutoff charging stage of the battery 300, the controller 400 is configured to control the second switch Q2 and the third switch Q3 in the power conversion structure 100 to be turned off, and control the first switch Q1, the fourth switch Q4, the fifth switch Q5, and the sixth switch Q6 to work, that is, work again in a state of the three-level buck converter shown in FIG. 6 to supply power to the load 200. In addition, in a working process of the three-level buck converter, the seventh switch Q7 is always in the turned-off state, so that the battery 300 enters the cutoff charging stage, that is, the power conversion structure works in the third working mode. In this way, high efficiency of a whole process of charging the battery 300 of the electronic device is achieved while supplying power to the power consumption unit (that is, the load 200) of the electronic device.

In an embodiment of actual application, when the battery 300 does not need to be charged, the input terminal din receives no input voltage, that is, the input terminal din is not connected to an external power supply or a voltage provided by an external power supply is 0 V, that is, no input voltage is inputted to the input terminal din, so that the controller 400 is configured to control the seventh switch Q7 in the power conversion structure 100 to be turned on, and control each of the first switch Q1, the second switch Q2, the third switch Q3, the fourth switch Q4, the fifth switch Q5, and the sixth switch Q6 to be turned off, that is, the power conversion structure 100 does not work. In this case, the battery 300 connected to the common node of the second switch Q2 and the third switch Q3 supplies power to the load 200 connected to the output terminal dout. In this case, the power conversion structure 100 works in the fourth working mode.

In the foregoing embodiment, the seventh switch Q7 is configured to be turned on to supply power to the power consumption unit (that is, the load 200) of the electronic device, and meanwhile the battery 300 of the electronic device is charged; or the battery 300 of the electronic device supplies power to the load 200, and the seventh switch Q7 is configured to be turned off to supply power to only the power consumption unit (that is, the load 200) of the electronic device, that is, the seventh switch Q7 implements a power path management function.

In an embodiment of actual application, when the seventh switch Q7 is turned on, the power conversion structure 100 does not work, and the battery 300 supplies power to the load 200, that is, when the power conversion structure 100 works in the fourth working mode, in response to a case that the voltage of the output terminal dout is reduced to the threshold voltage, the controller 400 is configured to control the first switch Q1, the second switch Q2, the third switch Q3, the fourth switch Q4, the fifth switch Q5, and the sixth switch Q6 in the power conversion structure wo to work to increase the voltage of the output terminal dout to a value greater than the voltage of the battery 300, to supply power to the load 200 connected to the output terminal dout, that is, the power conversion structure 100 works in the output voltage back-adjustment mode. That the first switch Q1, the second switch Q2, the third switch Q3, the fourth switch Q4, the fifth switch Q5, and the sixth switch Q6 work means that the first switch Q1, the second switch Q2, the third switch Q3, the fourth switch Q4, the fifth switch Q5, and the sixth switch Q6 switch between being turned on and being turned off with a specific frequency. For details, reference is made to a schematic diagram of a working waveform of a power conversion structure according to an embodiment of the present invention shown in FIG. 8, where a horizontal coordinate is a time t, and a vertical coordinate is a switch control signal SC. First, at a to moment, the first switch Q1, the third switch Q3, and the fifth switch Q5 are turned on, and the second switch Q2, the fourth switch Q4, and the sixth switch Q6 are turned off, so that the first flying capacitor Cf1 discharges, the inductor unit L1 performs energy storage, a current IL of the inductor unit is increased, and the voltage of the first terminal of the inductor unit L1 is twice the voltage of the battery 300. For details, reference may be made to a schematic diagram of a working principle of a first working stage of a power conversion structure according to an embodiment of the present invention shown in FIG. 9a. Then, at a t1 moment, the sixth switch Q6 is turned on, and the fifth switch Q5 is turned off, so that the inductor unit L1 performs current following, the current IL of the inductor unit is gradually reduced, and the voltage of the first terminal of the inductor unit L1 is the voltage of the battery 300. For details, reference may be made to a schematic diagram of a working principle of a second working stage of a power conversion structure according to an embodiment of the present invention shown in FIG. 9b. Then, at a t2 moment, the first switch Q1, the third switch Q3, and the sixth switch Q6 are turned off, and the second switch Q2, the fourth switch Q4, and the fifth switch Q5 are turned on, so that the first flying capacitor Cf1 charges, the inductor unit L1 continues to perform current following, the current IL of the inductor unit is gradually reduced, and the voltage of the first terminal of the inductor unit L1 is the voltage of the battery 300. For details, reference may be made to a schematic diagram of a working principle of a third working stage of a power conversion structure according to an embodiment of the present invention shown in FIG. 9c. At a t3 moment, a next switching period is entered. In this way, the voltage of the first terminal of the inductor unit L1 (switching between the voltage of the battery and twice the voltage of the battery) is adjusted to increase the voltage outputted to the load 200 from the voltage of the battery to a value greater than the voltage of the battery, to avoid poor user experience such as shutdown caused because the voltage received by the load 200 is less than the threshold voltage.

Figure 8:
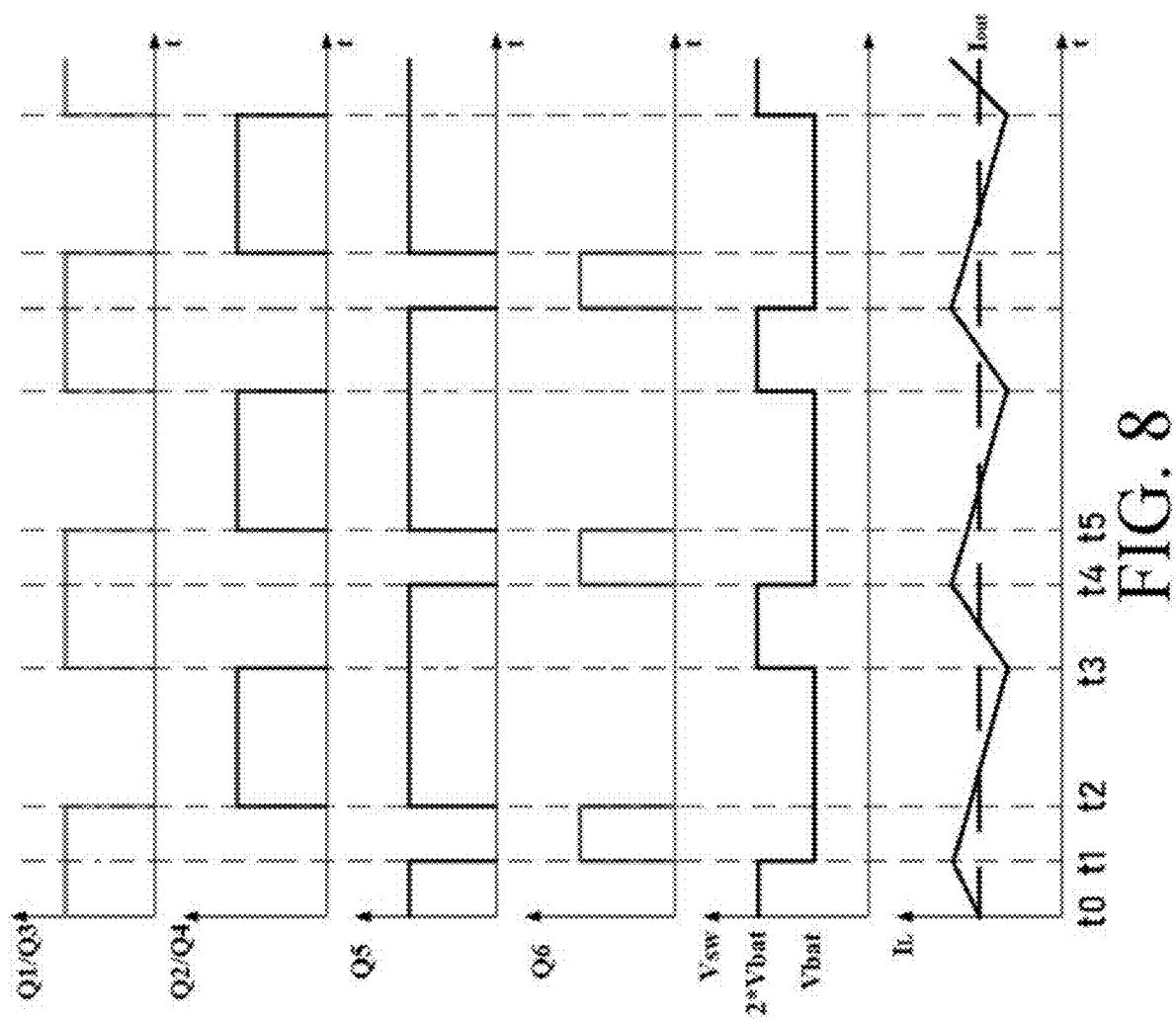
FIG. 8 is a schematic diagram of a working waveform of a power conversion structure according to an embodiment of the present invention.
Figure 9A:
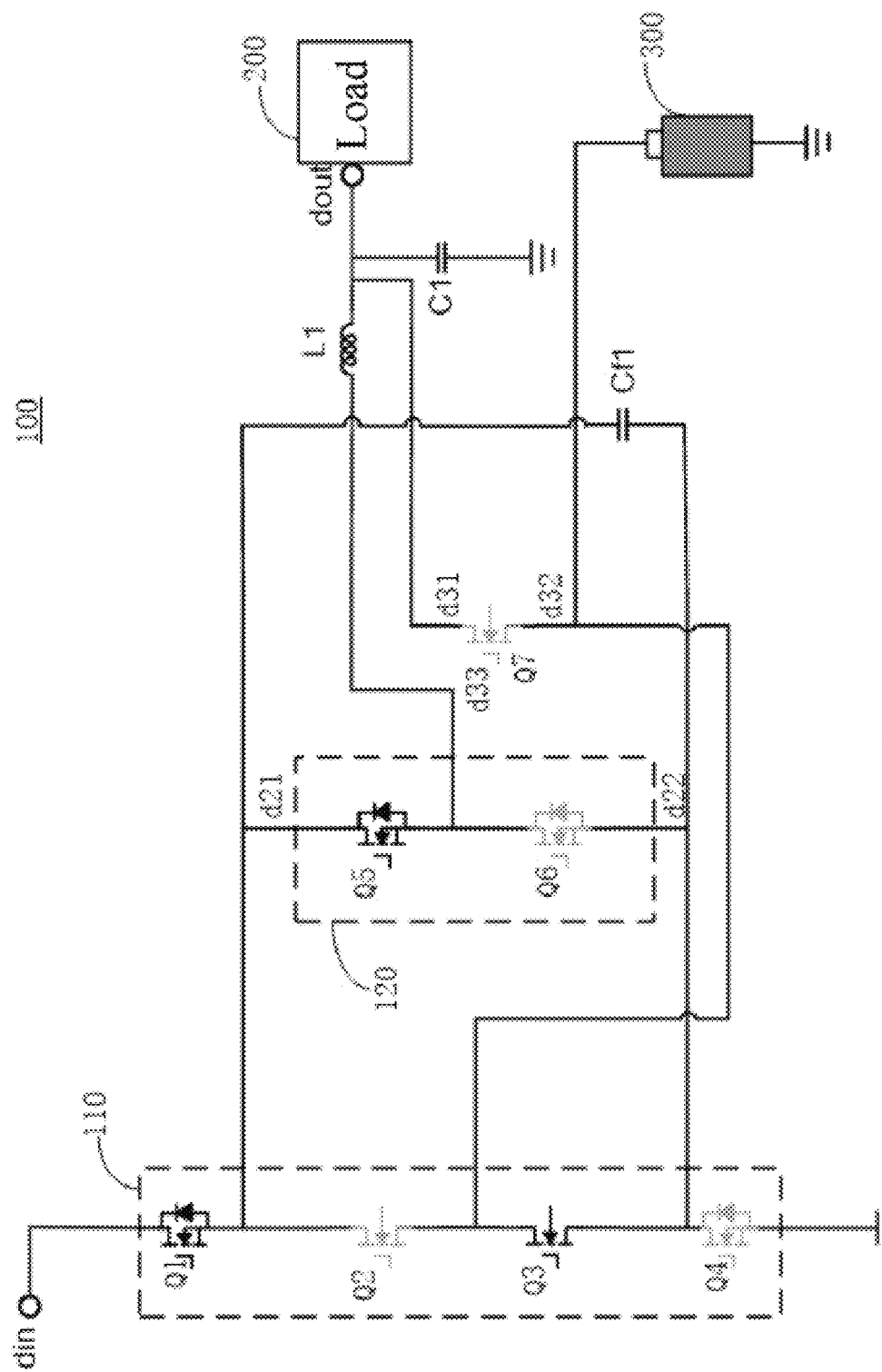
FIG. 9a is a schematic diagram of a working principle of a first working stage of a power conversion structure according to an embodiment of the present invention.
Figure 9B:
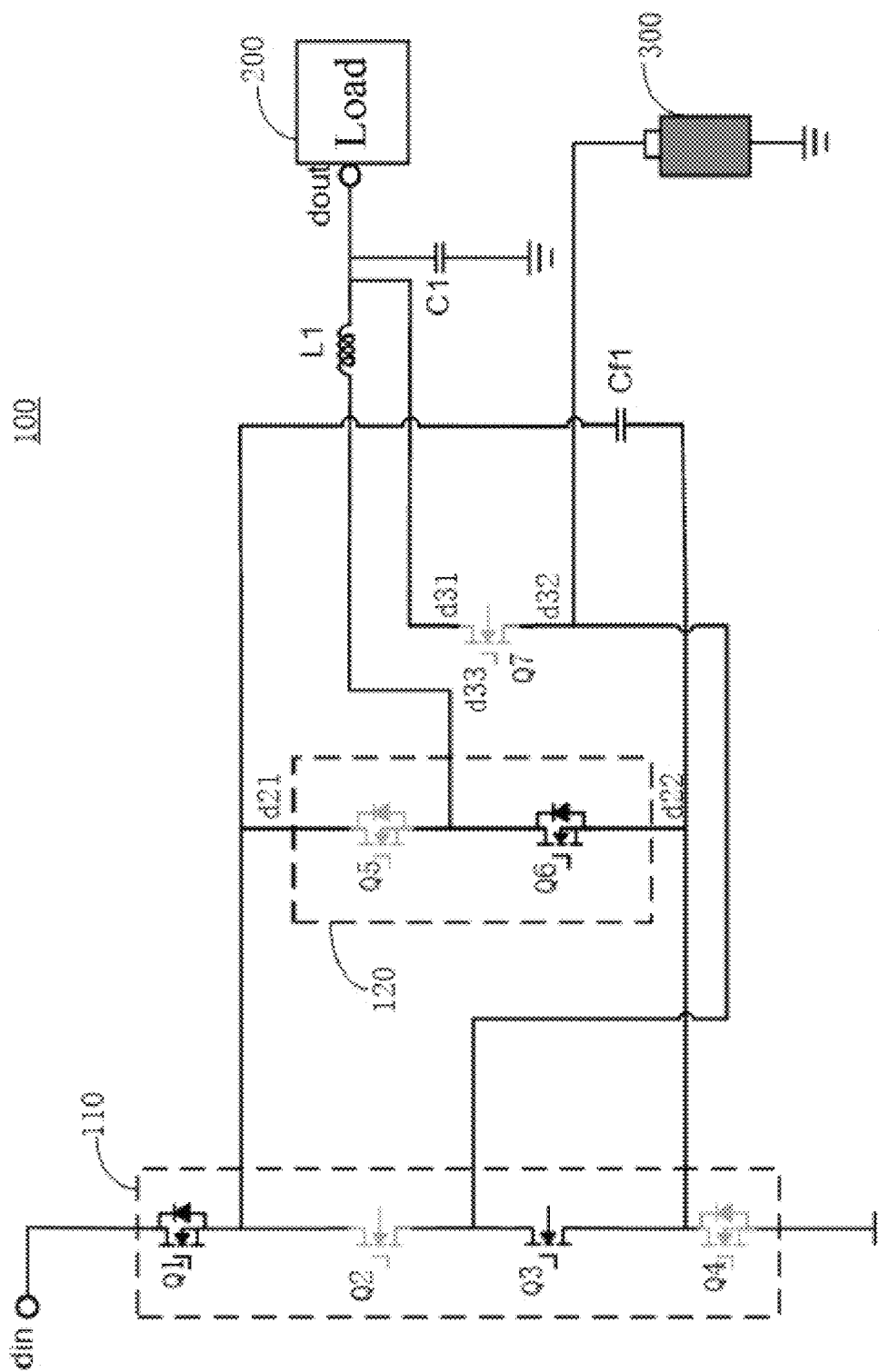
FIG. 9b is a schematic diagram of a working principle of a second working stage of a power conversion structure according to an embodiment of the present invention.
Figure 9C:
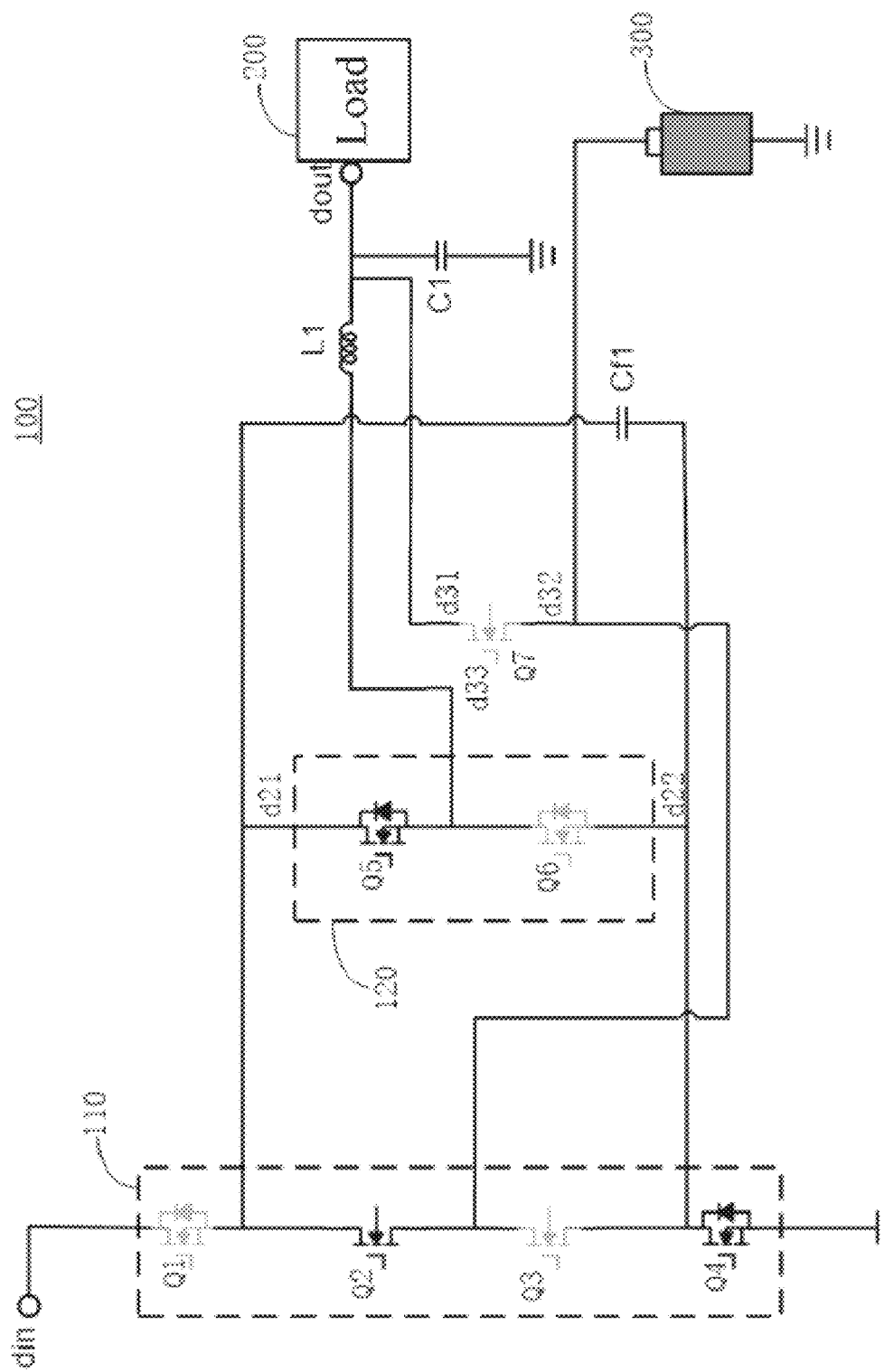
FIG. 9c is a schematic diagram of a working principle of a third working stage of a power conversion structure according to an embodiment of the present invention.

More specifically, in an embodiment, in the working process shown in FIG. 8, the first switch Q1, the second switch Q2, the third switch Q3, the fourth switch Q4, and the first flying capacitor form a switch capacitor converter, and a conversion ratio between an input voltage and an output voltage of the switch capacitor converter is 2:1. The voltage of the first terminal of the inductor unit L1 may switch between the voltage of the battery and twice the voltage of the battery, and the voltage outputted to the load 200 may be increased. In another embodiment, the conversion ratio between the input voltage and the output voltage of the switch capacitor converter may alternatively be N:1, where N is an integer greater than 2. More specifically, in an embodiment, in the working process shown in FIG. 8, magnitude of a voltage outputted by the output terminal dout may be adjusted by controlling a duty cycle of the fifth switch Q5. In this way, the voltage outputted to the load 200 is adjustable. For example, when the duty cycle of the fifth switch Q5 is 1, a filtering unit formed by the inductor unit L1 and the capacitor unit C1 filters the voltage of the first terminal of the inductor unit L1 (switching between the voltage of the battery and twice the voltage of the battery, for example, the switch capacitor converter wo works in a charge pump mode in which a conversion ratio is 2:1), so that the voltage outputted by the output terminal dout is close to 1.5 times the voltage of the battery, that is, the voltage outputted to the load 200 is increased from the voltage of the battery to a value close to 1.5 times the voltage of the battery.

In an embodiment, in the working process shown in FIG. 8, the seventh switch Q7 is always in a turned-off state. In this case, the power conversion structure 100 supplies power to the load 200.

Figure 10:
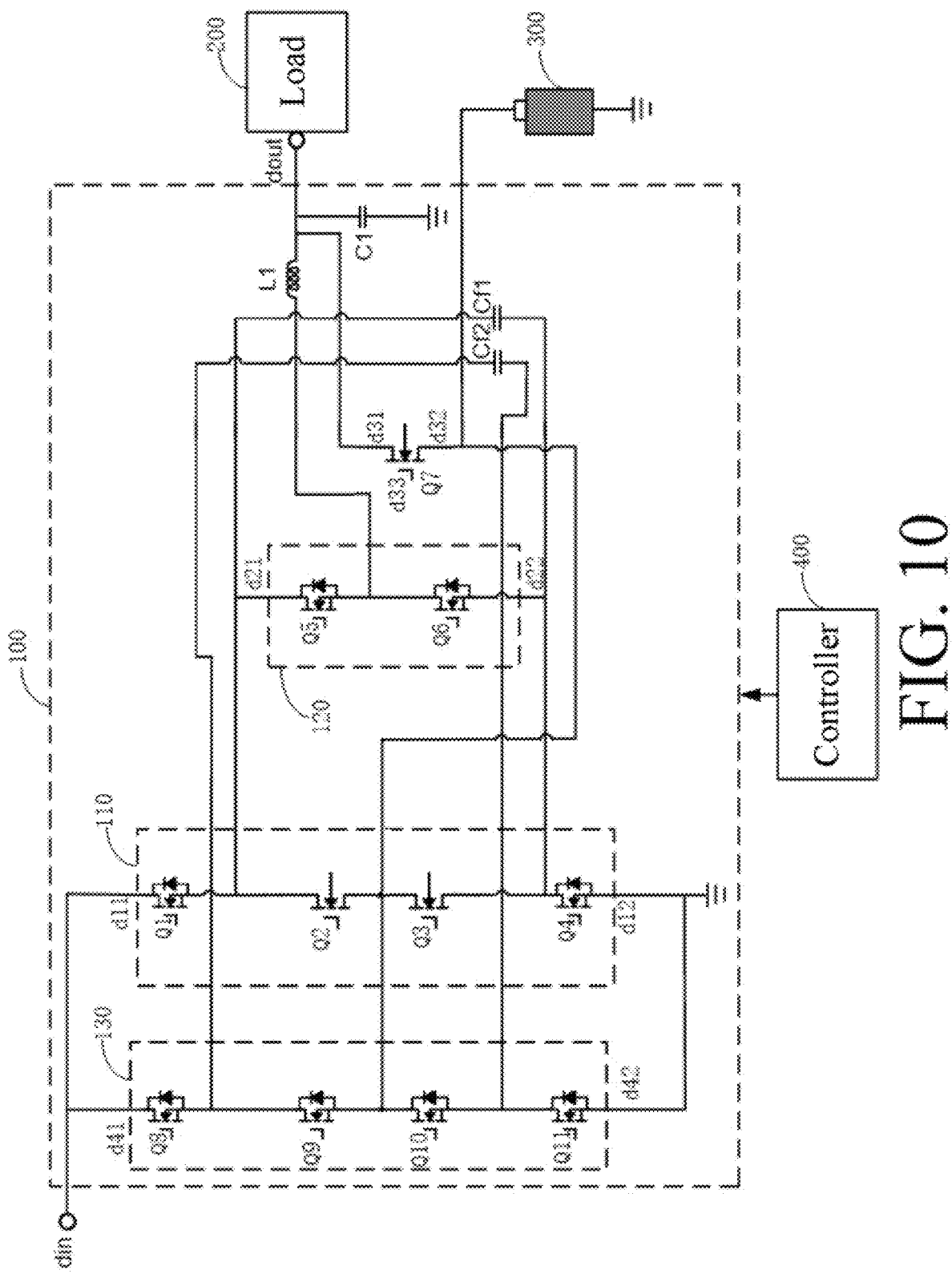
FIG. 10 is a schematic circuit diagram of a power conversion system according to another embodiment of the present invention.

For details, reference is made to a schematic circuit diagram of a power conversion system according to another embodiment of the present invention shown in FIG. 10. As shown in FIG. 10, the power conversion structure 100 further includes a second flying capacitor Cf2 and a third switch series branch 130, where the third switch series branch 130 includes an eighth switch Q8, a ninth switch Q9, a tenth switch Q10, and an eleventh switch Q11 connected in series, a first terminal d41 of the third switch series branch 130 is connected to the first terminal d11 of the first switch series branch 110, a second terminal d42 of the third switch series branch 130 is connected to the second terminal d12 of the first switch series branch 110, a common node of the eighth switch Q8 and the ninth switch Q9 is connected to a first terminal of the second flying capacitor Cf2, a common node of the tenth switch Q10 and the eleventh switch Q11 is connected to a second terminal of the second flying capacitor Cf2, and a common node of the ninth switch Q9 and the tenth switch Q10 is connected to the common node of the second switch Q2 and the third switch Q3. In this way, the eighth switch Q8, the ninth switch Q9, the tenth switch Q10, the eleventh switch Q11, and the second flying capacitor Cf2 form a second-phase switch capacitor converter, that is, FIG. 10 is integration of a two-phase switch capacitor converter and a three-level buck converter, thereby further improving the power level of the power conversion structure. Certainly, in an embodiment of the present invention, n second-phase switch capacitor converters connected in parallel shown in FIG. 10 may alternatively be included, where n is a positive integer, to implement a (n+1)-phase switch capacitor converter. The principle is stated explicitly with only two phases in FIG. 10.

The power conversion system shown in FIG. 10 may work in a fifth working mode of the plurality of working modes. In the fifth working mode, the controller 400 is configured to control the eighth switch Q8, the ninth switch Q9, the tenth switch Q10, and the eleventh switch Q11 in the power conversion structure 100 to work to charge the battery 300 connected to the common node of the second switch Q2 and the third switch Q3, control the first switch Q1, the fourth switch Q4, the fifth switch Q5, and the sixth switch Q6 to work to supply power to the load 200 connected to the output terminal dout, and control the second switch Q2 and the third switch Q3 to be turned off. That the eighth switch Q8, the ninth switch Q9, the tenth switch Q10, and the eleventh switch Q11 work means that the eighth switch Q8, the ninth switch Q9, the tenth switch Q10, and the eleventh switch Q11 switch between being turned on and being turned off with a specific frequency, so that the eighth switch Q8, the ninth switch Q9, the tenth switch Q10, the eleventh switch Q11, and the second flying capacitor Cf2 form a second-phase switch capacitor converter to charge the battery 300. That the first switch Q1, the fourth switch Q4, the fifth switch Q5, and the sixth switch Q6 work means that the first switch Q1, the fourth switch Q4, the fifth switch Q5, and the sixth switch Q6 switch between being turned on and being turned off with a specific frequency, so that the first switch Q1, the fourth switch Q4, the fifth switch Q5, the sixth switch Q6, the first flying capacitor Cf1, and the inductor unit L1 form a three-level buck converter to supply power to the load 200 connected to the output terminal dout.

In an embodiment of the present invention, a switch may alternatively be connected in series between the first terminal d11 of the first switch series branch 110 and the input terminal din, to implement a function of preventing current backflow.

In an embodiment of the present invention, each of the foregoing switches is an MOSFET, and includes a source, a drain, and a gate. A drain of the first switch Q1 forms the first terminal of d11 the first switch series branch 110, a source of the fourth switch Q4 forms the second terminal d12 of the first switch series branch 110, a source of the first switch Q1 is connected to a drain of the second switch Q2 and forms the common node of the first switch Q1 and the second switch Q2, a source of the second switch Q2 is connected to a drain of the third switch Q3 and forms the common node of the second switch Q2 and the third switch Q3, a source of the third switch Q3 is connected to a drain of the fourth switch Q4 and forms the common node of the third switch Q3 and the fourth switch Q4, a drain of the fifth switch Q5 forms the first terminal d21 of the second switch series branch 120, a source of the sixth switch Q6 forms the second terminal d22 of the second switch series branch 120, a source of the fifth switch Q5 is connected to a drain of the sixth switch Q6 and forms the common node of the fifth switch Q5 and the sixth switch Q6, a drain of the seventh switch Q7 is the first terminal d31 of the seventh switch Q7, a source of the seventh switch Q7 is the second terminal d32 of the seventh switch Q7, and a gate of each of the first switch Q1 to the seventh switch Q7 receives a switch control signal. Switches in the third switch series branch 130 and switches in the first switch series branch 110 shown in FIG. 10 have the same connection relationship. Details are not described herein again.

In an embodiment of the present invention, the foregoing switches may alternatively be bipolar junction transistors, super junction transistors, insulated gate bipolar transistors, power devices based on gallium nitride, and/or similar devices, as long as the devices can receive a switch control signal and be turned on or turned off in the industry.

In an embodiment of the present invention, each of the foregoing switches includes a single switch. During actual application, each switch may include a plurality of switches connected in series and/or in parallel.

In an embodiment of the present invention, an electronic device 10 is further provided. The electronic device 10 may be, for example, a portable device (including mobile phones, tablet computers, digital cameras, MP3 players and/or other similar electronic devices). For details, reference is made to a schematic structural diagram of an electronic device according to an embodiment of the present invention shown in FIG. 11. The electronic device includes the foregoing power conversion system, for example, the power conversion system shown in FIG. 5; a battery 300, where a first terminal of the battery 300 is connected to the common node of the second switch Q2 and the third switch Q3, and a second terminal of the battery 300 is grounded; and a load 200 in the electronic device 10, where the load 200 is connected to the output terminal dout, to receive an electric signal outputted by the output terminal dout. The load 200 is a power consumption unit of the electronic device.

In another embodiment of the present invention, when the power consumption unit in the electronic device needs to be supplied with power to and/or the battery 300 in the electronic device needs to be charged, an adapter 20 is connected to the electronic device 10, to provide an input voltage to the input terminal din of the power conversion system.

The present invention further provides a power conversion system. Reference is made again to a schematic structural diagram of a power conversion system according to another embodiment of the present invention shown in FIG. 5. As shown in FIG. 5, the power conversion system includes a power conversion structure 100 and a controller 400, where the power conversion structure 100 includes: a first switch series branch 110, a second switch series branch 120, a seventh switch Q7, an inductor unit L1, and a first flying capacitor Cf1, where the first switch series branch 110 includes a first switch Q1, a second switch Q2, a third switch Q3, and a fourth switch Q4 connected in series, the second switch series branch 120 includes a fifth switch Q5 and a sixth switch Q6 connected in series, a first terminal d11 of the first switch series branch 110 is connected to an input terminal din, the input terminal din is configured to receive an input voltage Vin, a second terminal d12 of the first switch series branch 110 is grounded, a common node of the first switch Q1 and the second switch Q2 is connected to a first terminal of the first flying capacitor Cf1 and a first terminal d21 of the second switch series branch 120, a common node of the third switch Q3 and the fourth switch Q4 is connected to a second terminal of the first flying capacitor Cf1 and a second terminal d22 of the second switch series branch 120, a common node of the fifth switch Q5 and the sixth switch Q6 is connected to a first terminal of the inductor unit L1, a second terminal of the inductor unit L1 is connected to an output terminal dout, the seventh switch Q7 includes a first terminal d31, a second terminal d32, and a control terminal d33, the first terminal d31 of the seventh switch Q7 is connected to the output terminal dout, the output terminal dout is connected to a load 200, the second terminal d32 of the seventh switch Q7 is connected to a common node of the second switch Q2 and the third switch Q3, the common node of the second switch Q2 and the third switch Q3 is configured to be connected to a battery 300, the control terminal d33 of the seventh switch Q7 is configured to receive a switch control signal, the second terminal of the inductor unit L1 is further connected to a first terminal of a capacitor unit C1, and a second terminal of the capacitor unit C1 is grounded; and where the controller 400 is configured to: when the input voltage Vin received by the input terminal din is zero volts and the battery 300 connected to the common node of the second switch Q2 and the third switch Q3 supplies power to a load 200 connected to the output terminal dout, in response to a case that a voltage of the output terminal dout is reduced to a threshold voltage, control the first switch Q1, the second switch Q2, the third switch Q3, the fourth switch Q4, the fifth switch Q5, and the sixth switch Q6 in the power conversion structure 100 to work to increase the voltage of the output terminal dout to a value greater than a voltage of the battery 300.

That is, in an embodiment of actual application, when the battery 300 does not need to be charged, the input terminal din receives no input voltage, that is, the input terminal din is not connected to an external power supply, that is, the input voltage Vin received by the input terminal din is zero volts, so that the controller 400 is configured to control the seventh switch Q7 in the power conversion structure 100 to be turned on, and control each of the first switch Q1, second switch Q2, the third switch Q3, the fourth switch Q4, the fifth switch Q5, and the sixth switch Q6 to be turned off, that is, the power conversion structure 100 does not work. In this case, the battery 300 supplies power to the load 200. In this working process, in response to a case that the voltage of the output terminal dout is reduced to the threshold voltage, the controller 400 is configured to control the power conversion structure 100 to work in the output voltage back-adjustment mode, that is, control the first switch Q1, the second switch Q2, the third switch Q3, the fourth switch Q4, the fifth switch Q5, and the sixth switch Q6 in the power conversion structure 100 to work to increase the voltage of the output terminal dout to a value greater than the voltage of the battery 300, to supply power to the load 200 connected to the output terminal dout. That the first switch Q1, the second switch Q2, the third switch Q3, the fourth switch Q4, the fifth switch Q5, and the sixth switch Q6 work means that the first switch Q1, the second switch Q2, the third switch Q3, the fourth switch Q4, the fifth switch Q5, and the sixth switch Q6 switch between being turned on and being turned off with a specific frequency. A specific working principle thereof is similar to those described in FIG. 8, FIG. 9a, FIG. 9b, and FIG. 9c. Details are not described herein again.

More specifically, in an embodiment, in the working process shown in FIG. 8, the first switch Q1, the second switch Q2, the third switch Q3, the fourth switch Q4, and the first flying capacitor form a switch capacitor converter, and a conversion ratio between an input voltage and an output voltage of the switch capacitor converter is 2:1. The voltage of the first terminal of the inductor unit L1 may switch between the voltage of the battery and twice the voltage of the battery, and the voltage outputted to the load 200 may be increased. In another embodiment, the conversion ratio between the input voltage and the output voltage of the switch capacitor converter may alternatively be N:1, where N is an integer greater than 2. More specifically, in an embodiment, in the working process shown in FIG. 8, magnitude of a voltage outputted by the output terminal dout may be adjusted by controlling a duty cycle of the fifth switch Q5. In this way, the voltage outputted to the load 200 is adjustable. For example, when the duty cycle of the fifth switch Q5 is 1, a filtering unit formed by the inductor unit L1 and the capacitor unit C1 filters the voltage of the first terminal of the inductor unit L1 (switching between the voltage of the battery and twice the voltage of the battery, for example, the switch capacitor converter 100 works in a charge pump mode in which a conversion ratio is 2:1), so that the voltage outputted by the output terminal dout is close to 1.5 times the voltage of the battery, that is, the voltage outputted to the load 200 is increased from the voltage of the battery to a value close to 1.5 times the voltage of the battery.

In an embodiment, in the working process shown in FIG. 8, the seventh switch Q7 is always in a turned-off state. In this case, the power conversion structure 100 supplies power to the load 200.

Figure 6:
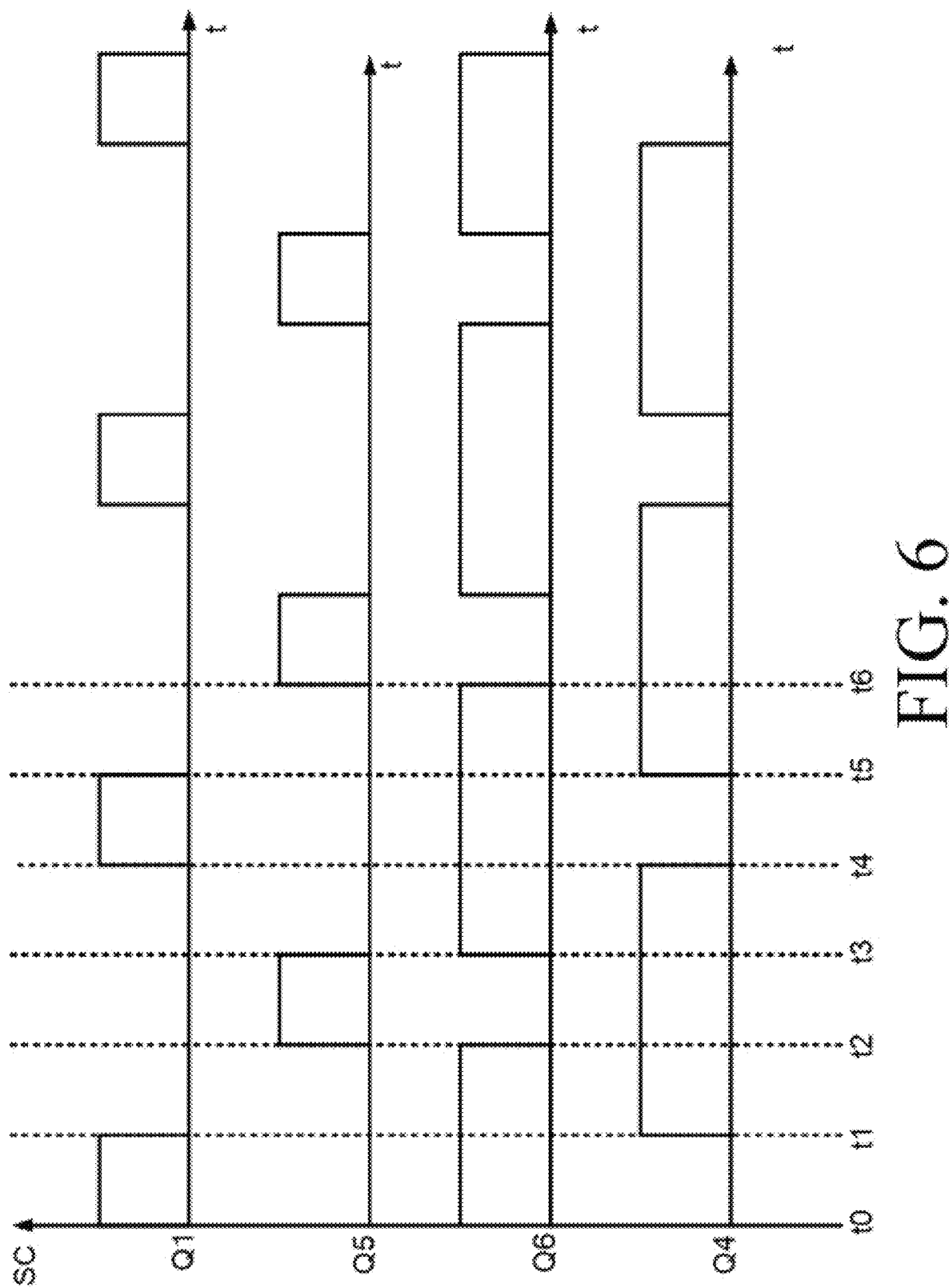
FIG. 6 is a schematic diagram of a working waveform of a power conversion structure according to an embodiment of the present invention.
Figure 7:
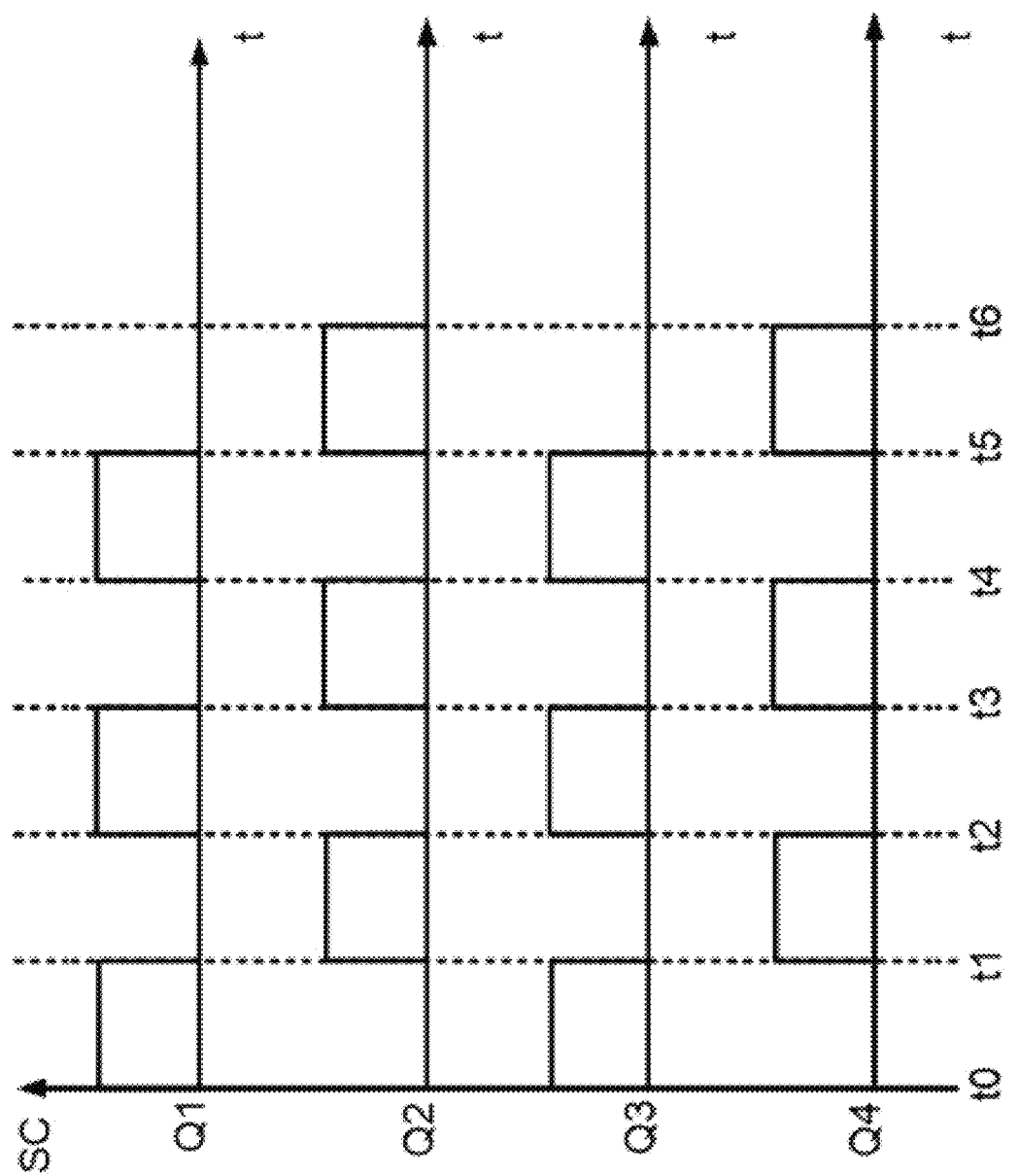
FIG. 7 is a schematic diagram of a working waveform of a power conversion structure according to an embodiment of the present invention.

In an embodiment of actual application, When the battery 300 needs to be charged, the input terminal din receives an input voltage, that is, the input terminal din is connected to an external power supply. The controller 400 is configured to: control, when the input terminal din receives an input voltage, the power conversion structure 100 to work in one of a plurality of working modes, where the plurality of working modes include: a first working mode, where the controller 400 controls the seventh switch Q7 to be in a saturated state or completely turned-on state, controls the second switch Q2 and the third switch Q3 to be turned off, and controls the first switch Q1, the fourth switch Q4, the fifth switch Q5, and the sixth switch Q6 to work to supply power to the load 200 connected to the output terminal dout and charge the battery 300 connected to the common node of the second switch Q2 and the third switch Q3; a second working mode, where the controller 400 controls the seventh switch Q7 to be turned on, controls the fifth switch Q5 and the sixth switch Q6 to be turned off, and controls the first switch Q1, the second switch Q2, the third switch Q3, and the fourth switch Q4 to work to charge the battery 300 connected to the common node of the second switch Q2 and the third switch Q3 and supply power to the load 200 connected to the output terminal dout; and a third working mode, where the controller 400 controls the seventh switch Q7, the second switch Q2, and the third switch Q3 to be turned off, and controls the first switch Q1, the fourth switch Q4, the fifth switch Q5, and the sixth switch Q6 to work to supply power to the load 200 connected to the output terminal dout. The principle of the first working mode is shown in FIG. 6, the principle of the second working mode is shown in FIG. 7, and the principle of the third working mode is shown in FIG. 6. The principles are similar to that of the foregoing whole charging process of the trickle charging stage, the pre-charging stage, the constant current charging stage, the constant voltage charging stage, and the cutoff charging stage of the battery 300. Details are not described herein again.

In an embodiment, the power conversion structure 100 further includes a second flying capacitor Cf2 and a third switch series branch 130, which are specifically shown in FIG. 10. Details are not described herein again.

Figure 11:
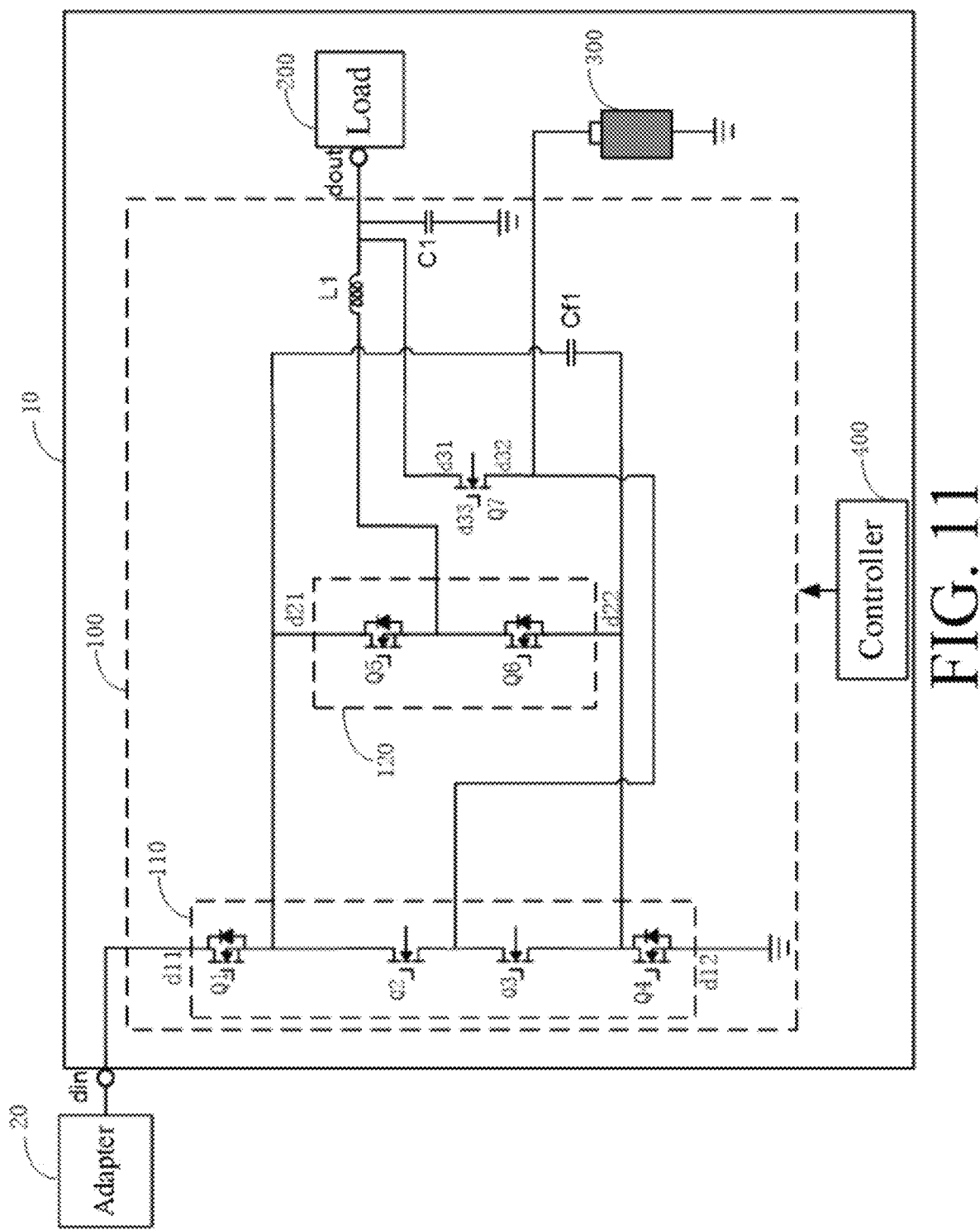
FIG. 11 is a schematic structural diagram of an electronic device according to an embodiment of the present invention.

In an embodiment of the present invention, an electronic device 10 is further provided. The electronic device 10 may be, for example, a portable device (including mobile phones, tablet computers, digital cameras, MP3 players and/or other similar electronic devices). Specifically, the electronic device shown in FIG. 11 is not described in detail herein again. The electronic device includes the foregoing power conversion system, for example, the power conversion system shown in FIG. 5; a battery 300, where a first terminal of the battery 300 is connected to the common node of the second switch Q2 and the third switch Q3, and a second terminal of the battery 300 is grounded; and a load 200 in the electronic device 10, where the load 200 is connected to the output terminal dout, to receive an electric signal outputted by the output terminal dout. The load 200 is a power consumption unit of the electronic device.

In another embodiment of the present invention, when the power consumption unit in the electronic device does not need to be supplied with power to and/or the battery 300 in the electronic device does not need to be charged, the adapter 20 is unplugged from the electronic device 10, the controller 400 controls the seventh switch Q7 to be turned on, and the battery 300 supplies power to the load 200; and when the voltage outputted to the load 200 is excessively low, for example, less than the threshold voltage, poor user experience such as shutdown may be caused. To ensure normal use of the electronic device, the voltage outputted to the load 200 needs to be adjusted back. In this way, the controller 400 controls the seventh switch Q7 to be turned off, and controls the power conversion structure 100 to work in the foregoing voltage back-adjustment mode, to increase the voltage outputted to the load 200 to a value greater than the voltage of the battery 300, thereby ensuring normal use of the electronic device 10.

Figure 12:
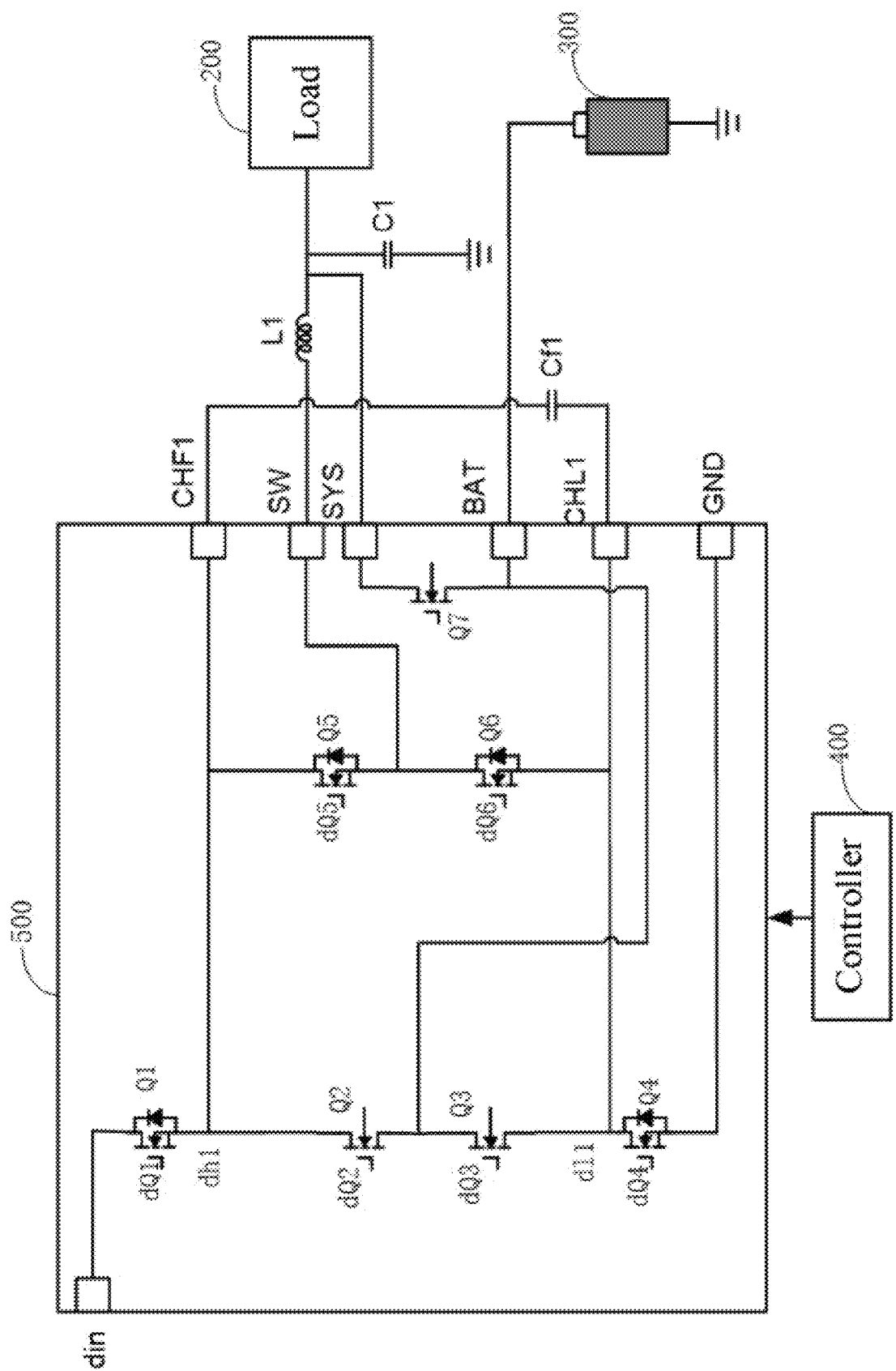
FIG. 12 is a schematic circuit diagram of an integrated circuit according to an embodiment of the present invention.

The present invention further provides an integrated circuit. Reference is made again to a schematic circuit diagram of an integrated circuit according to an embodiment of the present invention shown in FIG. 12. As shown in FIG. 12, the integrated circuit 500 includes: an input terminal din, configured to receive an input voltage Vin; a first switch Q1, connected between the input terminal din and a first top electrode plate node dh1, where the first switch Q1 has a first control node dQ1; a second switch Q2, connected between the first top electrode plate node dh1 and a battery terminal BAT, where the second switch Q2 has a second control node dQ2, and the battery terminal BAT is configured to be connected to a battery 300; a third switch Q3, connected between the battery terminal BAT and a first bottom electrode plate node dl1, where the third switch Q3 has a third control node dQ3; a fourth switch Q4, connected between the first bottom electrode plate node dl1 and a grounding terminal GND, where the fourth switch Q4 has a fourth control node dQ4; a conversion node terminal SW, configured to provide an electric signal at a conversion node to an inductor L1, where the inductor L1 is connected in series between the conversion node terminal SW and a system terminal SYS, and a capacitor C1 is connected between the system terminal SYS and the grounding terminal GND; a fifth switch Q5, connected between the first top electrode plate node dh1 and the conversion node terminal SW, where the fifth switch Q5 has a fifth control node dQ5; a sixth switch Q6, connected between the first bottom electrode plate node dl1 and the conversion node terminal SW, where the sixth switch Q6 has a sixth control node dQ6; a seventh switch Q7, connected between the system terminal SYS and the battery terminal BAT, where the seventh switch Q7 has a seventh control node dQ7; and a first flying capacitor terminal CHF1 and a second flying capacitor terminal CHL1, configured to be respectively connected to a first terminal and a second terminal of a first flying capacitor Cf1, where the first flying capacitor terminal CHF1 is connected to the first top electrode plate node dh1, and the second flying capacitor terminal CHL1 is connected to the first bottom electrode plate node dl1.

As shown in FIG. 12, the first switch Q1, the second switch Q2, the third switch Q3, the fourth switch Q4, and the first flying capacitor Cf1 form a typical switch capacitor converter, and the first switch Q1, the fifth switch Q5, the sixth switch Q6, the fourth switch Q4, the inductor unit L1, and the first flying capacitor Cf1 form a typical three-level buck converter. In this way, the integrated circuit shown in FIG. 12 may integrate the three-level buck converter and the switch capacitor converter. Switches of the switch capacitor converter and the three-level buck converter are reused, and the quantity of switches is reduced, so that the power conversion structure provided in the present invention has a small volume and low costs, and can have advantages of both the three-level buck converter and the switch capacitor converter, to achieve high efficiency of a whole process of charging the battery 300 of the electronic device while supplying power to the power consumption unit of the electronic device, that is, the load 200 connected to the system terminal SYS, and implement stable and reliable running of the electronic device. In addition, the first flying capacitor Cf1 of the three-level buck converter and the switch capacitor converter is shared, which can further reduce the volume of the power conversion structure.

Referring to FIG. 12 again, in an embodiment of the present invention, a controller 400 is further included, and connected to the first control node to the seventh control node in the integrated circuit 500, where the controller 400 is configured to: control, when the input terminal din receives an input voltage Vin, that is, the input terminal din is connected to an external power supply, a power conversion structure formed by the integrated circuit 500, the inductor L1, the first flying capacitor Cf1, and the capacitor C1 to work in a charge pump mode or a buck mode. Specifically, in an embodiment, a conversion ratio between an input voltage and an output voltage of the charge pump mode is N:1, where N is an integer greater than or equal to 2. The buck mode is used for forming the three-level buck converter.

Referring to FIG. 12 again, in an embodiment of the present invention, a controller 400 is further included, and connected to the first control node to the seventh control node in the integrated circuit 5500, where the controller 400 is configured to: control, when no input voltage is inputted to the input terminal din, that is, the input terminal din receives no input voltage, or the input terminal din is not connected to an external power supply, or an input voltage Vin received by the input terminal din is zero volts, the battery terminal BAT to supply power to the system terminal SYS; and the controller 400 controls, in response to a case that a voltage of the system terminal SYS is reduced to a threshold voltage, the first switch Q1, the second switch Q2, the third switch Q3, the fourth switch Q4, the fifth switch Q5, and the sixth switch Q6 to work to increase the voltage of the system terminal to a value greater than a voltage of the battery 300. That is, when the battery 300 in the electronic device does not need to be charged, the adapter 20 is unplugged from the electronic device 10, the controller 400 controls the seventh switch Q7 to be turned on, and the battery 300 supplies power to the load 200; and when the voltage outputted to the load 200 is excessively low, for example, less than the threshold voltage, poor user experience such as shutdown may be caused. To ensure normal use of the electronic device, the voltage outputted to the load 200 needs to be adjusted back. In this way, the controller 400 controls the seventh switch Q7 to be turned off, and controls the power conversion structure 100 to work in the foregoing voltage back-adjustment mode, to increase the voltage outputted to the load 200 to a value greater than the voltage of the battery 300, thereby ensuring normal use of the electronic device 10. That the first switch Q1, the second switch Q2, the third switch Q3, the fourth switch Q4, the fifth switch Q5, and the sixth switch Q6 work means that the first switch Q1, the second switch Q2, the third switch Q3, the fourth switch Q4, the fifth switch Q5, and the sixth switch Q6 switch between being turned on and being turned off with a specific frequency. A specific working principle thereof is similar to those described in FIG. 8, FIG. 9a, FIG. 9b, and FIG. 9c. Details are not described herein again.

Figure 13:
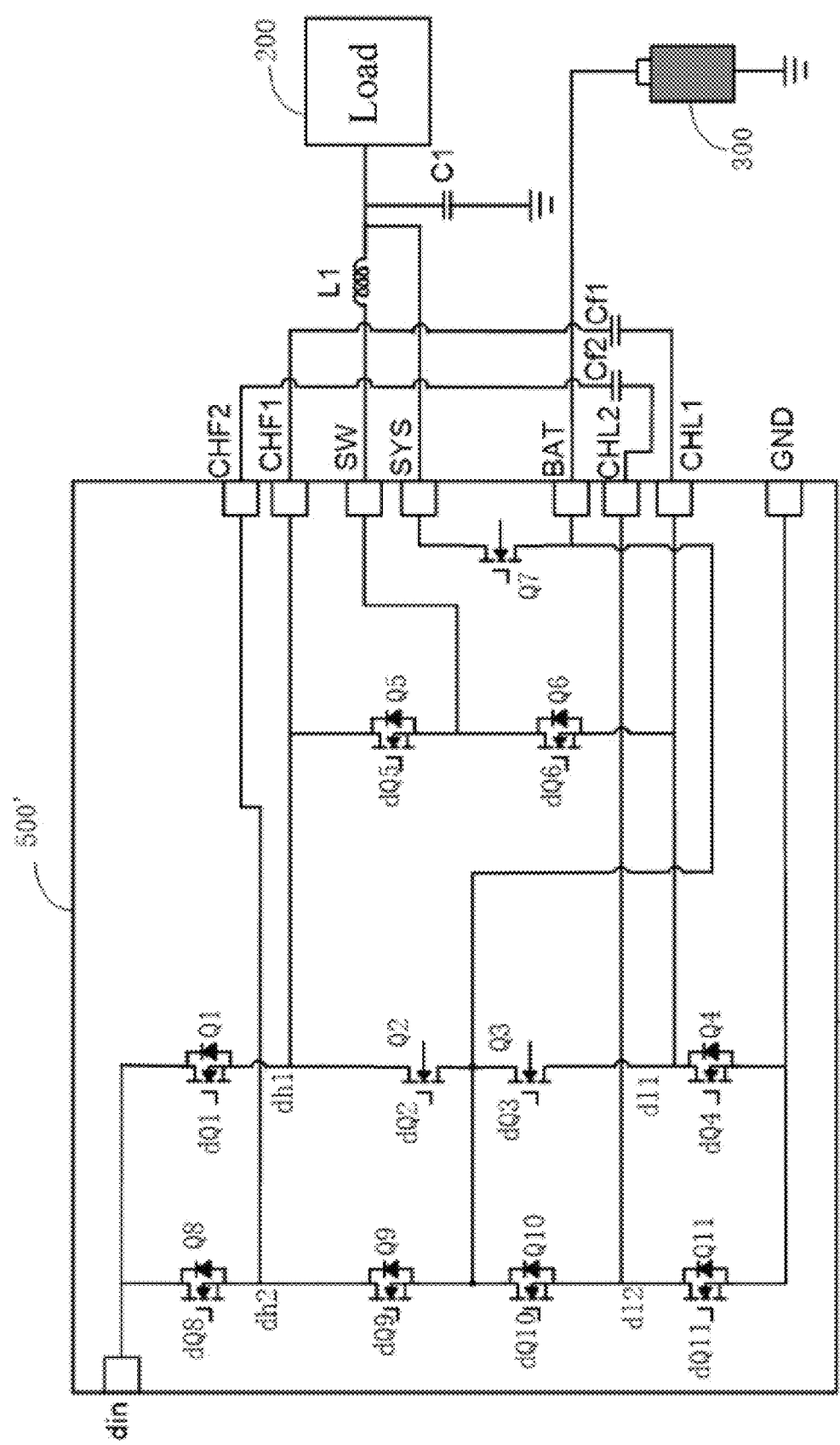
FIG. 13 is a schematic circuit diagram of an integrated circuit according to another embodiment of the present invention.

Reference is made again to a schematic circuit diagram of an integrated circuit according to another embodiment of the present invention shown in FIG. 13. As shown in FIG. 13, the integrated circuit 500' further includes: an eighth switch Q8, connected between the input terminal din and a second top electrode plate node dh2, where the eighth switch Q8 has an eighth control node dQ8; a ninth switch Q9, connected between the second top electrode plate node dh2 and the battery terminal BAT, where the ninth switch Q9 has a ninth control node dQ9; a tenth switch Q10, connected between the battery terminal BAT and a second bottom electrode plate node dl2, where the tenth switch Q10 has a tenth control node dQ10; an eleventh switch Q11, connected between the second bottom electrode plate node dl2 and the grounding terminal GND, where the eleventh switch Q11 has an eleventh control node dQ11; and a third flying capacitor terminal CHF2 and a fourth flying capacitor terminal CHL2, configured to be connected to a first terminal and a second terminal of a second flying capacitor Cf2, where the third flying capacitor terminal CHF2 is connected to the second top electrode plate node dh2, and the fourth flying capacitor terminal CHL2 is connected to the second bottom electrode plate node dl2. In this way, the eighth switch Q8, the ninth switch Q9, the tenth switch Q10, the eleventh switch Q11, and the second flying capacitor Cf2 form a second-phase switch capacitor converter, that is, FIG. 13 is integration of a two-phase switch capacitor converter and a three-level buck converter, thereby further improving the power level of the power conversion structure. Certainly, in an embodiment of the present invention, n second-phase switch capacitor converters connected in parallel shown in FIG. 13 may alternatively be included, where n is a positive integer, to implement a (n+1)-phase switch capacitor converter. The principle is stated explicitly with only two phases in FIG. 13.

Figure 14:
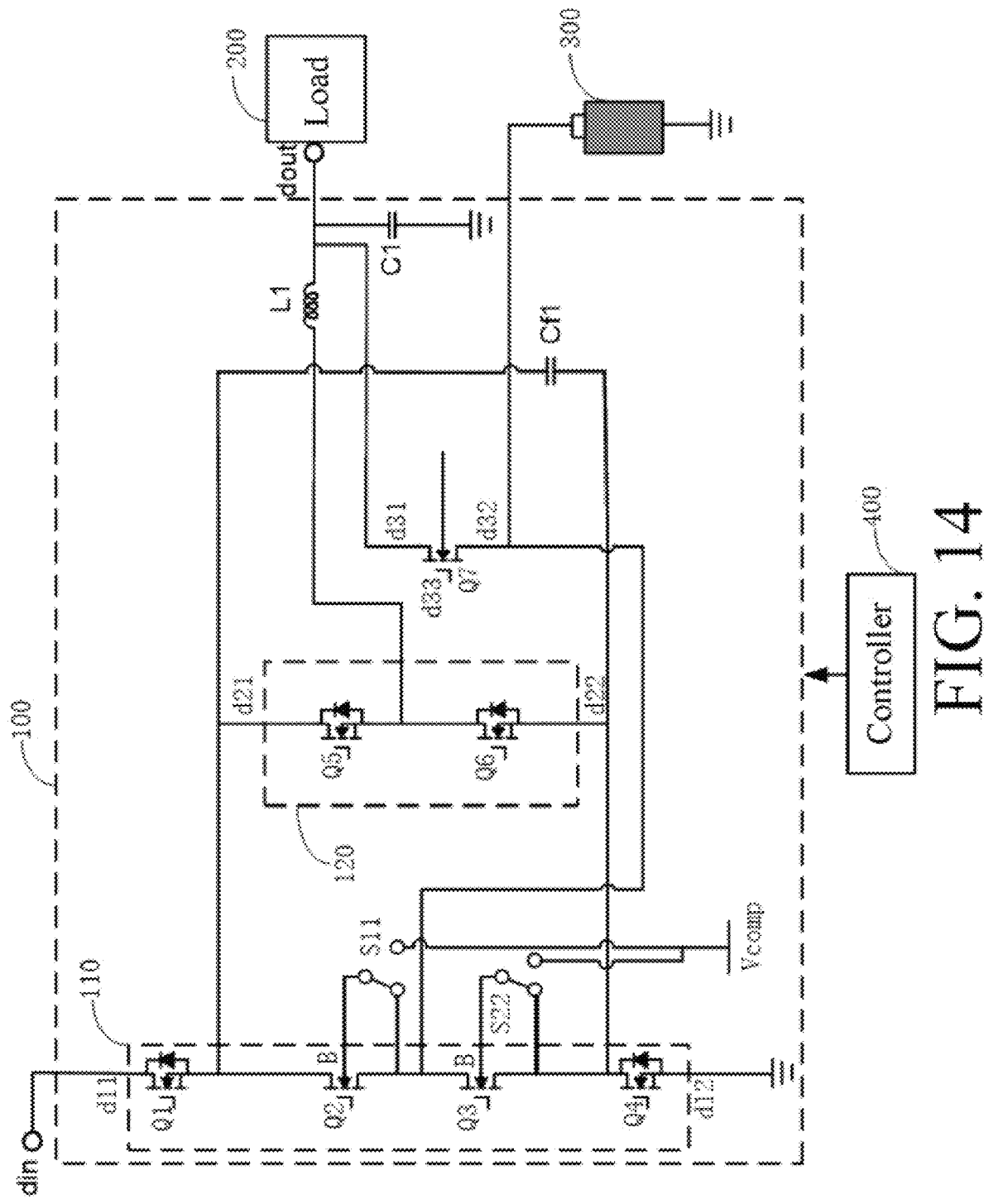
FIG. 14 is a schematic diagram of a power conversion system according to another embodiment of the present invention.

In an embodiment of actual application, when the second switch Q2 and the third switch Q3 are in the turned-off state, it is intended that the second switch Q2 and the third switch Q3 are completely cut off. In the foregoing embodiment, two parasitic diodes connected in anti-series back to back are connected in parallel at two terminals of the second switch Q2 and the third switch Q3. Specifically, using the second switch Q2 as an example, anodes of the two diodes are connected together, where a cathode of one diode is connected to the first terminal of the second switch Q2, and a cathode of the other diode is connected to the second terminal of the second switch Q2, so that the two diodes are connected in anti-series. The structure of the third switch Q3 is the same as that of the second switch Q2. Details are not described herein again. Furthermore, in an embodiment of actual application, when the seventh switch Q7 is in the turned-off state, a cutoff scenario (such as a ship mode) exists, that is, the seventh switch Q7 may have the same structure as that of the second switch Q2. In another embodiment of the present invention, reference is made to a schematic circuit diagram of a power conversion structure according to another embodiment of the present invention shown in FIG. 14. A substrate B of a second switch Q2 is led out, and is connected to a first selection switch S11. A substrate B of a third switch Q3 is led out, and is connected to a second selection switch S22. When working in a switch capacitor converter mode, the first selection switch S11 is connected to a source of the second switch Q2 (using an MOSFET as an example). When working in a three-level buck converter mode, the first selection switch S11 is connected to a compensation voltage Vcomp, so that the second switch Q2 is completely cut off. Similarly, when working in the switch capacitor converter mode, the second selection switch S22 is connected to a source of the third switch Q3 (using an MOSFET as an example). When working in the three-level buck converter mode, the second selection switch S22 is connected to the compensation voltage Vcomp, so that the third switch Q3 is completely cut off. In an embodiment of the present invention, the compensation voltage Vcomp is less than a voltage of a battery 300. In an embodiment of the present invention, as shown in FIG. 14, a substrate B of a seventh switch Q7 is also led out.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A power conversion system comprising:
    a power conversion structure comprising a first switch series branch, a second switch series branch, a seventh switch, an inductor unit, and a first flying capacitor, wherein:
        the first switch series branch comprises a first switch, a second switch, a third switch, and a fourth switch connected in series;
        the second switch series branch comprises a fifth switch and a sixth switch connected in series;
        a first terminal of the first switch series branch is connected to an input terminal;
        the input terminal is configured to receive an input voltage;
        a second terminal of the first switch series branch is grounded;
        a common node of the first switch and the second switch is connected to a first terminal of the first flying capacitor and a first terminal of the second switch series branch;
        a common node of the third switch and the fourth switch is connected to a second terminal of the first flying capacitor and a second terminal of the second switch series branch;
        a common node of the fifth switch and the sixth switch is connected to a first terminal of the inductor unit;
        a second terminal of the inductor unit is connected to an output terminal;
        the seventh switch comprises a first terminal, a second terminal, and a control terminal;
        the first terminal of the seventh switch is connected to the output terminal;
        the second terminal of the seventh switch is connected to a common node of the second switch and the third switch;
        the common node of the second switch and the third switch is configured to be connected to a battery;
        the control terminal of the seventh switch is configured to receive a switch control signal;

the second terminal of the inductor unit is further connected to a first terminal of a capacitor unit; and
a second terminal of the capacitor unit is grounded; and
a controller, wherein the controller is configured to control, when the input terminal receives an input voltage, the power conversion structure to operate in one of a plurality of working modes, and wherein the plurality of working modes comprise:
a first working mode, and wherein the controller controls the seventh switch to be in a saturated state or a completely turned-on state, controls the second switch and the third switch to be turned off, and controls the first switch, the fourth switch, the fifth switch, and the sixth switch to operate to supply power to a load connected to the output terminal and charge the battery connected to the common node of the second switch and the third switch;
a second working mode, and wherein the controller controls the seventh switch to be turned on, controls the fifth switch and the sixth switch to be turned off, and controls the first switch, the second switch, the third switch, and the fourth switch to operate to charge the battery connected to the common node of the second switch and the third switch and supply power to the load connected to the output terminal; and
a third working mode, and wherein the controller controls the seventh switch, the second switch, and the third switch to be turned off, and controls the first switch, the fourth switch, the fifth switch, and the sixth switch to operate to supply power to the load connected to the output terminal, and wherein:
when no input voltage is inputted to the input terminal, the controller is configured to control the power conversion structure to operate in a fourth working mode;
in the fourth working mode, the controller controls the seventh switch to be turned on, and controls the first switch, the second switch, the third switch, the fourth switch, the fifth switch, and the sixth switch to be turned off; and
the battery connected to the common node of the second switch and the third switch supplies power to the load connected to the output terminal.

2. The power conversion system according to claim 1, wherein:
when the power conversion structure operates in the fourth working mode, in response to a case that a voltage of the output terminal is reduced to a threshold voltage, the controller controls the power conversion structure to operate in an output voltage back-adjustment mode; and
in the output voltage back-adjustment mode, the controller controls the first switch, the second switch, the third switch, the fourth switch, the fifth switch, and the sixth switch to operate to increase the voltage of the output terminal to a value greater than a voltage of the battery.

3. The power conversion system according to claim 2, wherein:
in the output voltage back-adjustment mode, the first switch, the second switch, the third switch, the fourth switch, and the first flying capacitor form a switch capacitor converter, and a conversion ratio of the switch capacitor converter is N:1, and wherein N is an integer greater than or equal to 2.

4. The power conversion system according to claim 3, wherein:

a magnitude of a voltage outputted by the output terminal is adjusted by controlling a duty cycle of the fifth switch.

5. The power conversion system according to claim 1, further comprising:
a second flying capacitor and a third switch series branch, wherein:
the third switch series branch comprises an eighth switch, a ninth switch, a tenth switch, and an eleventh switch connected in series;
a first terminal of the third switch series branch is connected to the first terminal of the first switch series branch;
a second terminal of the third switch series branch is connected to the second terminal of the first switch series branch;
a common node of the eighth switch and the ninth switch is connected to a first terminal of the second flying capacitor;
a common node of the tenth switch and the eleventh switch is connected to a second terminal of the second flying capacitor; and
a common node of the ninth switch and the tenth switch is connected to the common node of the second switch and the third switch.

6. The power conversion system according to claim 5, wherein:
the plurality of working modes further comprise a fifth working mode, and wherein:
in the fifth working mode, the controller controls the eighth switch, the ninth switch, the tenth switch, and the eleventh switch to operate to charge the battery connected to the common node of the second switch and the third switch, controls the first switch, the fourth switch, the fifth switch, and the sixth switch to operate to supply power to the load connected to the output terminal, and controls the second switch and the third switch to be turned off.

7. The power conversion system according to claim 1, wherein:
at a trickle charging stage, a pre-charging stage, and a constant voltage charging stage of the battery, the power conversion structure is configured to operate in the first working mode, and the battery is a battery connected to the common node of the second switch and the third switch;
at a constant current charging stage of the battery, the power conversion structure is configured to operate in the second working mode, and the battery is a battery connected to the common node of the second switch and the third switch; and
at a cutoff charging stage of the battery, the power conversion structure is configured to operate in the third working mode, and the battery is a battery connected to the common node of the second switch and the third switch.

8. A power conversion system comprising:
a power conversion structure comprising a first switch series branch, a second switch series branch, a seventh switch, an inductor unit, and a first flying capacitor, wherein:
the first switch series branch comprises a first switch, a second switch, a third switch, and a fourth switch connected in series;
the second switch series branch comprises a fifth switch and a sixth switch connected in series;

a first terminal of the first switch series branch functions as an input terminal;
the input terminal is configured to receive an input voltage;
a second terminal of the first switch series branch is grounded;
a common node of the first switch and the second switch is connected to a first terminal of the first flying capacitor and a first terminal of the second switch series branch;
a common node of the third switch and the fourth switch is connected to a second terminal of the first flying capacitor and a second terminal of the second switch series branch;
a common node of the fifth switch and the sixth switch is connected to a first terminal of the inductor unit;
a second terminal of the inductor unit is connected to an output terminal;
the seventh switch comprises a first terminal, a second terminal, and a control terminal;
the first terminal of the seventh switch is connected to the output terminal;
the second terminal of the seventh switch is connected to a common node of the second switch and the third switch;
the common node of the second switch and the third switch is configured to be connected to a battery;
the control terminal of the seventh switch is configured to receive a switch control signal;
the second terminal of the inductor unit is further connected to a first terminal of a capacitor unit; and
a second terminal of the capacitor unit is grounded; and
a controller, wherein the controller is configured to:
when the input voltage received by the input terminal is zero volts and the battery connected to the common node of the second switch and the third switch supplies power to a load connected to the output terminal, in response to a case that a voltage of the output terminal is reduced to a threshold voltage, the controller controls the power conversion structure to operate in an output voltage back-adjustment mode; and
in the output voltage back-adjustment mode, the controller controls the first switch, the second switch, the third switch, the fourth switch, the fifth switch, and the sixth switch to operate to increase the voltage of the output terminal to a value greater than a voltage of the battery.

9. The power conversion system according to claim 8, wherein:
in the output voltage back-adjustment mode, the first switch, the second switch, the third switch, the fourth switch, and the first flying capacitor form a switch capacitor converter; and
a conversion ratio of the switch capacitor converter is N:1, and wherein N is an integer greater than or equal to 2.

10. The power conversion system according to claim 9, wherein:
a magnitude of a voltage outputted by the output terminal is adjusted by controlling a duty cycle of the fifth switch.

11. The power conversion system according to claim 8, wherein:
the controller is further configured to control, when the input terminal receives an input voltage, the power conversion structure to operate in one of a plurality of working modes, wherein the plurality of working modes comprise:
a first working mode, and wherein the controller controls the seventh switch to be in a saturated state or a completely turned-on state, controls the second switch and the third switch to be turned off, and controls the first switch, the fourth switch, the fifth switch, and the sixth switch to operate to supply power to the load connected to the output terminal and charge the battery connected to the common node of the second switch and the third switch;
a second working mode, and wherein the controller controls the seventh switch to be turned on, controls the fifth switch and the sixth switch to be turned off, and controls the first switch, the second switch, the third switch, and the fourth switch to operate to charge the battery connected to the common node of the second switch and the third switch and supply power to the load connected to the output terminal; and
a third working mode, and wherein the controller controls the seventh switch, the second switch, and the third switch to be turned off, and control the first switch, the fourth switch, the fifth switch, and the sixth switch to operate to supply power to the load connected to the output terminal.

12. The power conversion system according to claim 8, further comprising:
a second flying capacitor and a third switch series branch, and wherein:
the third switch series branch comprises an eighth switch, a ninth switch, a tenth switch, and an eleventh switch connected in series;
a first terminal of the third switch series branch is connected to the first terminal of the first switch series branch;
a second terminal of the third switch series branch is connected to the second terminal of the first switch series branch;
a common node of the eighth switch and the ninth switch is connected to a first terminal of the second flying capacitor;
a common node of the tenth switch and the eleventh switch is connected to a second terminal of the second flying capacitor; and
a common node of the ninth switch and the tenth switch is connected to the common node of the second switch and the third switch.

13. An integrated circuit, comprising:
an input terminal configured to receive an input voltage;
a first switch connected between the input terminal and a first top electrode plate node, wherein the first switch has a first control node;
a second switch connected between the first top electrode plate node and a battery terminal, wherein the second switch has a second control node, and the battery terminal is configured to be connected to a battery;
a third switch connected between the battery terminal and a first bottom electrode plate node, wherein the third switch has a third control node;
a fourth switch connected between the first bottom electrode plate node and a grounding terminal, wherein the fourth switch has a fourth control node;
a conversion node terminal configured to provide an electric signal at a conversion node to an inductor, wherein the inductor is connected in series between the conversion node terminal and a system terminal, and a capacitor unit is connected between the system terminal and the grounding terminal;

a fifth switch connected between the first top electrode plate node and the conversion node terminal, wherein the fifth switch has a fifth control node;

a sixth switch connected between the first bottom electrode plate node and the conversion node terminal, wherein the sixth switch has a sixth control node;

a seventh switch connected between the system terminal and the battery terminal, wherein the seventh switch has a seventh control node;

a first flying capacitor terminal and a second flying capacitor terminal configured to be respectively connected to a first terminal and a second terminal of a first flying capacitor, wherein the first flying capacitor terminal is connected to the first top electrode plate node, and the second flying capacitor terminal is connected to the first bottom electrode plate node; and a controller connected to nodes from the first control node to the seventh control node, wherein the controller is configured to: control, when no input voltage is inputted to the input terminal, the battery terminal to supply power to the system terminal, and control, in response to a case that a voltage of the system terminal is reduced to a threshold voltage, the first switch, the second switch, the third switch, the fourth switch, the fifth switch, and the sixth switch to operate to increase the voltage of the system terminal to a value greater than a voltage of the battery.

14. The integrated circuit according to claim 13, wherein:
the controller is further configured to: control, when the input terminal receives an input voltage, a power conversion structure formed by the integrated circuit, the inductor, the first flying capacitor, and the capacitor unit to operate in a charge pump mode or a buck mode.

15. The integrated circuit according to claim 13, comprising:
an eighth switch connected between the input terminal and a second top electrode plate node, wherein the eighth switch has an eighth control node;

a ninth switch connected between the second top electrode plate node and the battery terminal, wherein the ninth switch has a ninth control node;

a tenth switch connected between the battery terminal and a second bottom electrode plate node, wherein the tenth switch has a tenth control node;

an electrode plate node and the grounding terminal, wherein the eleventh switch has an eleventh control node; and a third flying capacitor terminal and a fourth flying capacitor terminal configured to be connected to a first terminal and a second terminal of a second flying capacitor, wherein the third flying capacitor terminal is connected to the second top electrode plate node, and the fourth flying capacitor terminal is connected to the second bottom electrode plate node.

* * * * *